United States Patent [19]

Raab

[11] 4,314,251

[45] Feb. 2, 1982

[54] REMOTE OBJECT POSITION AND ORIENTATION LOCATER

[75] Inventor: Frederick H. Raab, Burlington, Vt.

[73] Assignee: The Austin Company, Cleveland, Ohio

[21] Appl. No.: 62,140

[22] Filed: Jul. 30, 1979

[51] Int. Cl.³ .............................................. G01S 5/02
[52] U.S. Cl. .................... 343/112 R; 324/208; 324/247; 324/343; 340/27 NA; 343/113 R; 364/449
[58] Field of Search ............... 343/112 R, 113 R; 324/207, 208, 247, 330, 335, 343; 340/27 NA; 364/444, 449

[56] References Cited

U.S. PATENT DOCUMENTS

| | | | |
|---|---|---|---|
| 2,432,858 | 12/1947 | Brown | 250/11 |
| 2,623,924 | 12/1952 | Cartier et al. | 324/330 |
| 3,103,663 | 9/1963 | Parker | 343/108 |
| 3,133,283 | 2/1962 | Ghose | 343/100 |
| 3,354,459 | 11/1967 | Schwartz et al. | 343/100 |
| 3,526,886 | 9/1970 | Lubich | 340/282 |
| 3,529,682 | 9/1970 | Coyne et al. | 175/45 |
| 3,560,977 | 2/1971 | Cayzac | 343/100 |
| 3,589,454 | 6/1971 | Coyne | 175/26 |
| 3,656,161 | 4/1972 | MacPherson | 343/100 |
| 3,712,391 | 1/1973 | Coyne | 175/26 |
| 3,731,752 | 5/1973 | Schad | 175/45 |
| 3,900,878 | 8/1975 | Tsao | 343/112 |
| 3,906,504 | 9/1975 | Guster et al. | 343/112 |
| 4,054,881 | 10/1977 | Raab | 343/112 R |
| 4,072,200 | 2/1978 | Morris et al. | 175/45 |
| 4,163,977 | 8/1979 | Polstorff | 343/112 |
| 4,197,855 | 4/1980 | Lewin | 128/653 |
| 4,208,024 | 6/1980 | Killpatrick et al. | 244/3.15 |

FOREIGN PATENT DOCUMENTS

| | | |
|---|---|---|
| 658759 | 10/1951 | United Kingdom . |
| 684229 | 12/1952 | United Kingdom . |
| 724031 | 2/1955 | United Kingdom . |
| 755886 | 8/1956 | United Kingdom . |
| 965326 | 7/1961 | United Kingdom . |
| 1111768 | 5/1968 | United Kingdom . |
| 1157899 | 7/1969 | United Kingdom . |

Primary Examiner—T. H. Tubbesing
Attorney, Agent, or Firm—Price, Heneveld, Huizenga & Cooper

[57] ABSTRACT

Two mutually orthogonal radiating antennas each transmit electromagnetic radiation to three mutually orthogonal receiving antennas. The transmitted electromagnetic radiation carries data characterizing the phase and magnetic moment of the electromagnetic radiation. Measurement of the two transmitted signals as received by the set of three orthogonal receiving antennas produces information which, in combination with two known position or orientation parameters, is sufficient to determine in a noniterative manner the six position and orientation parameters of the receiving antennas with respect to the radiating antennas. Use of only two radiating antennas increases the speed of the system and simplifies the transmitter. Alternatively, three radiating antennas and two receiving antennas may be provided to simplify the receiver.

31 Claims, 21 Drawing Figures

NEAR-FIELD AND FAR FIELD

BASIC FIELD PATTERN

LOCATION COORDINATES (A)

(B)

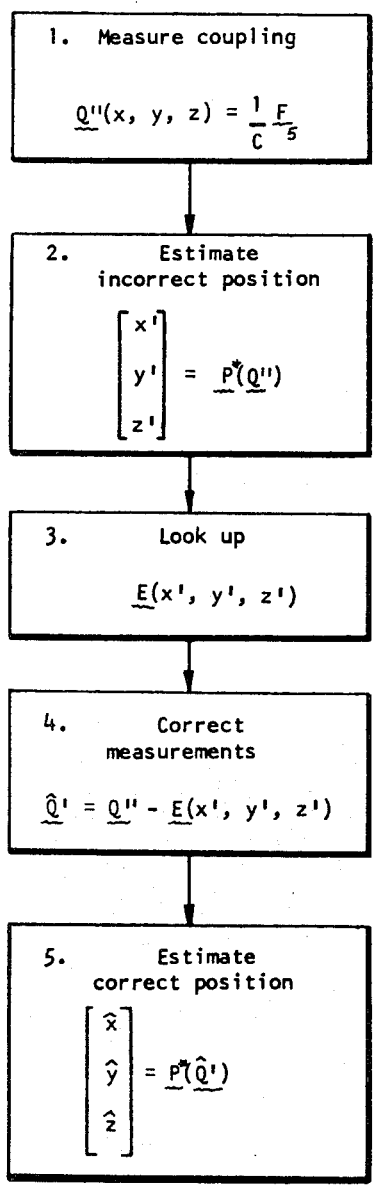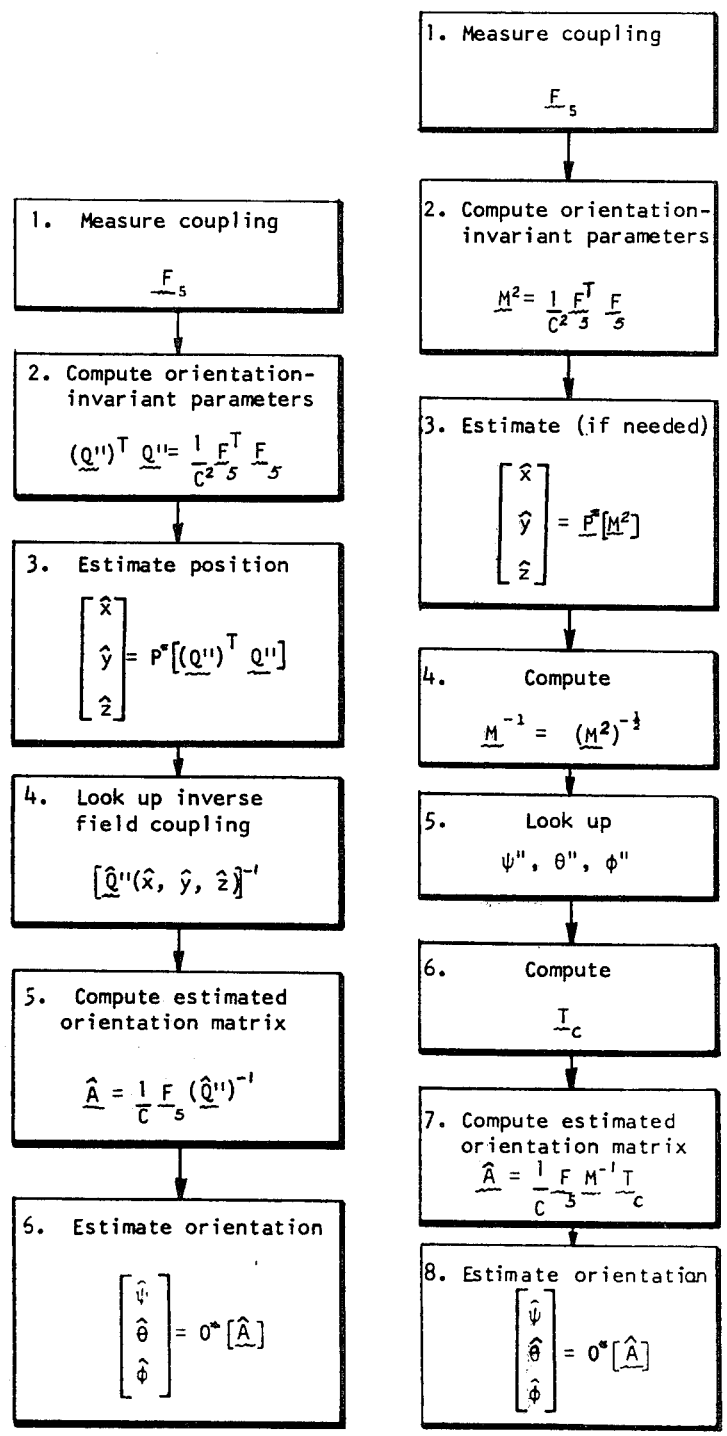
Fig. 17. Compensation technique for zero-orientation sensor
Fig. 18. Direct algorithm using inverse field coupling
Fig. 19. Direct algorithm using rotation

REMOTE OBJECT POSITION AND ORIENTATION LOCATER

BACKGROUND OF THE INVENTION

This invention relates to determining the position and orientation of a remote object with respect to a reference point; and, more particularly, to radiating an electromagnetic field from the reference point, detecting the field at the remote object and analyzing the detected field to determine the position and orientation of the remote object.

The use of orthogonal coils for generating and sensing magnetic fields is well known. For example, such apparatus has received wide attention in the area of mapping magnetic fields to provide a better understanding of their characteristics. If a magnetic field around generating coils can be very accurately mapped through use of sensing coils, it has also been perceived that it might be possible to determine the location of the sensing coils relative to the generating coils based on what is sensed. However, a problem associated with doing this is that there is more than one location and/or orientation within a usual magnetic dipole field that will provide the same characteristic sensing signals in a sensing coil. In order to use a magnetic field for this purpose, additional information must therefore be provided.

One approach to provide the additional information required for this purpose is to have the generating and sensing coils move with respect to each other, such as is taught in U.S. Pat. No. 3,644,825. The motion of the coils generates changes in the magnetic field, and the resulting signals then may be used to determine direction of the movement or the relative position of the generating and sensing coils. While such an approach removes some ambiguity about the position on the basis of the field sensed, its accuracy is dependent on the relative motion, and it cannot be used at all without the relative motion.

Another approach, that has been suggested, to provide the additional required information is to make the magnetic field rotate as taught in Kalmus, "A New Guiding and Tracking System," IRE Transactions on Aerospace and Navigational Electronics, March 1962, pages 7–10. To determine the distance between a generating and a sensing coil accurately, this approach requires that the relative orientation of the coils be maintained constant. It therefore cannot be used to determine both the relative translation and relative orientation of the generating and sensing coils.

U.S. Pat. No. 3,868,565 teaches a tracking system for continuously determining at the origin of a reference coordinate system the relative translation and orientation of a remote object. The tracking system includes radiating and sensing antenna arrays each having three orthogonally positioned loops. Properly controlled excitation of the radiating antenna array allows the instantaneous composite radiated electromagnetic field to be equivalent to that of a single loop antenna oriented in any desired direction. Further control of the excitation causes the radiated field to nutate about an axis denoted a pointing vector.

The tracking system is operated as a closed loop system with a computer controlling the radiated field orientation and interpreting the measurements made at the sensing antenna array. That is, an information feedback loop from the sensing antenna array to the radiating antenna array provides information for pointing the axis of the nutating field toward the sensing antenna array. Accordingly, the pointing vector gives the direction to the sensing antenna array from the radiating antenna array. The proper orientation of the pointing vector is necessary for computation of the orientation of the remote object. The signals detected at the sensing antenna include a nutation component. The nutating field produces a different nutation component in each of the three detected signals. The orientation of the sensing antenna array relative to the radiated signal is determined from the magnitudes of these nutation components.

U.S. Pat. No. 4,054,881 teaches a near-field non-tracking system for determining, at a remote object, the position of the remote object with respect to a reference coordinate system. The orientation of the remote object can be determined, at the remote object, with respect to the reference coordinate system by using an iterative computational scheme.

This is accomplished by applying electrical signals to each of three mutually orthogonal radiating antennas, the electrical signals being multiplexed with respect to each other and containing information characterizing the polarity and magnetic moment of the radiated electromagnetic fields. The radiated fields are detected and measured by three mutually orthogonal receiving antennas having a known relationship to the remote object, which produces nine parameters. These nine parameters, in combination with one known position or orientation parameter, are sufficient to determine the position and orientation parameters of the receiving antennas with respect to the position and orientation of the radiating antennas.

U.S. patent application, Ser. No. 954,126, filed Oct. 24, 1978, entitled METHOD AND APPARATUS FOR TRACKING OBJECTS, teaches a tracking system for: (a) determining at the origin of a first body coordinate reference frame the relative position and orientation of a second body and (b) determining at the origin of a second body coordinate reference frame the relative position and orientation of the first body. Each body of the tracking system includes at least two independently oriented stub dipoles for radiating and sensing electromagnetic fields. Properly controlled excitation of the radiating antenna allows the radiated field to nutate about an axis denoted a pointing vector.

The first body receives radiation transmitted from the second body and establishes the pointing angles to the second body with respect to the first body coordinate reference frame. The processing which determines the pointing angles is based on the fact that no modulation or nutation components exist in the radial direction between the two bodies. The field received by the first body can include information defining the second body's pointing angles to the first body with respect to the second body's coordinate reference frame and the relative roll about their mutually aligned pointing axes. This information is sufficient for determining the orientation of the first body relative to the second.

The above process is then repeated with the second body receiving radiation transmitted from the first body. Further, information can be transmitted from the first body to the second body which establishes a vector from the second body to a third body, thus defining the location of the third body at the second body.

While the art of determining the position and orientation of remote objects is a well developed one, there still remains a need to determine the orientation of a remote object, at that remote object, with respect to a source reference coordinate frame, with increased speed, in a noniterative computational manner, in the context of a near field nontracking position and orientation determining system. Further, and in the same context, there is a need for a reduction in the complexity and cost of these systems.

SUMMARY OF THE INVENTION

Accordingly, in one embodiment of this invention, three orthogonal electromagnetic field receiving means located at a remote object are used to sense two distinct electromagnetic fields radiated by two orthogonal transmitting means located at a reference coordinate frame. The electromagnetic fields radiated by the transmitting means contain information characterizing the phase and magnetic moment of the radiated electromagnetic fields. If the remote object is restricted in two position or orientation parameters, measurement of the two transmitted electromagnetic fields by the set of three orthogonal receiving means produces information which is sufficient to determine the six position and orientation parameters of the remote object relative to the reference frame. This greatly reduces the complexity of the transmitter associated with the two orthogonal transmitting means and increases the speed of the system. The separation distance of the remote object from the transmitting means is the near field range and is determined by comparing the magnetic moment, or strength, of the transmitted electromagnetic field to the strength of the electromagnetic field which is received by the three orthogonal receiving means.

Although described above with respect to three orthogonal electromagnetic field receiving means and two orthogonal transmitting means according to another embodiment of the invention apparatus for determining the position and orientation of a remote object relative to a reference coordinate frame can comprise two orthogonal electromagnetic receiving means located at the remote object and three orthogonal transmitting means located at the reference coordinate frame. This greatly reduces the complexity of the receiver associated with the two orthogonal receiving means.

According to a more narrow aspect of the invention, determination of the position and orientation of the remote object with respect to the orientation of the reference coordinate frame is carried out by noniterative processing of the information received. The three receiving antennas detecting the two radiated electromagnetic fields (or two receiving antennas and three radiated fields) provide information which is sufficient to determine the six position and orientation parameters of the remote object relative to the reference frame. However, unless two orientation or position parameters are specified, there are two unresolvable ambiguities encountered in determining the position or orientation of the remote object. These ambiguities result from mirror images of the remote object through the origin of the reference frame and on opposite sides of the reference frame. Nevertheless, this invention is particularly suited for determining the position and orientation of an airplane with respect to a landing site. Suitable parameters that may be specified to resolve the ambiguities are that the airplane is flying right side up or upside down and that the airplane is approaching the landing site from either the north or south, or the east or west. This invention is further suited for determining the position and orientation of a remotely controlled underground drill with respect to the surface of the earth. Suitable parameters to specify in the latter case are that the remote object is below the origin of reference frame and is restricted to the quadrants north or south of its starting point. Accordingly, from a practical viewpoint the aforementioned ambiguities are of little importance.

BRIEF DESCRIPTION OF THE DRAWINGS

FIG. 17 is a flow diagram of a computation scheme for compensating for field scattering;

FIG. 18 is a flow diagram for another computation scheme for compensating for field scattering; and FIG. 19 is a flow diagram for another computation scheme for compensating for field scattering.

DETAILED DESCRIPTION OF THE PREFERRED EMBODIMENTS

Landing Air System Two State Excitation

Figure 1:
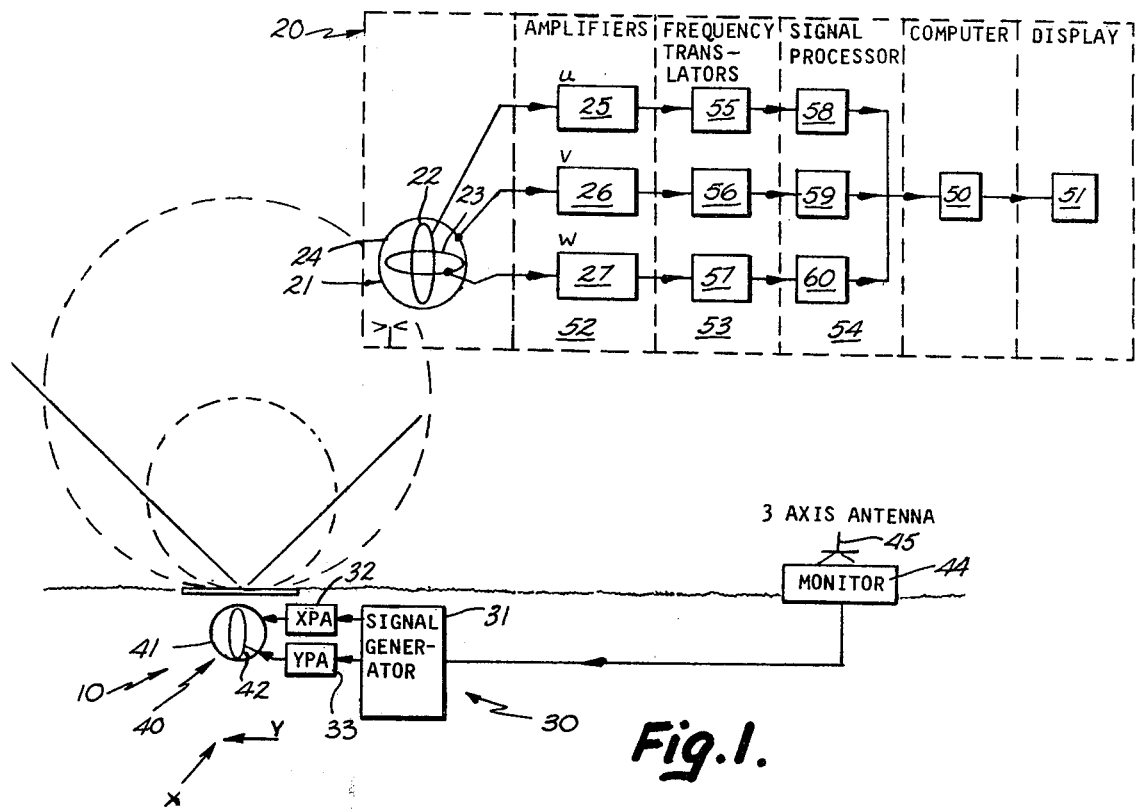
FIG. 1 is a partly block, side elevational view of a landing aid system in accordance with an embodiment of this invention.

Referring to FIG. 1, a landing air system 10 includes ground based components 30 for producing an electromagnetic field and airborne components 20 for receiving the electromagnetic field and determining the position and orientation of airborne components 20 with respect to ground based components 30. In this embodiment, two radiating antennas and three receiving antennas are employed. Ground based components include a signal generator 31 coupled in parallel to power amplifiers 32 and 33. A ground antenna array 40 includes orthogonal loop antennas 41 and 42 (denoted X,Y) coupled to power amplifiers 32 and 33, respectively. The use of two transmitting antennas 41 and 42, as opposed to using three transmitting antennas, increases both the speed of transmission and the simplicity of the transmitter. A monitor receiver 44 is coupled to signal generator 31. The monitor receiver is spaced from ground antenna array 40 and includes an orthogonal antenna array 45 for receiving electromagnetic radiation from gound antenna array 40. Monitor receiver 44 provides a means of verifying the electromagnetic transmission from ground antenna array 40. Airborne components 20 include a three-axis receiving antenna consisting of mutually orthogonal elements (21,22 and 23); and three identical channels of amplification (25,26 and 27), frequency translation (55,56 and 57) and signal processing (58,59 and 60). The three signal-processor outputs are sequentially coupled to the computer 50, which determines the position and orientation for display at 51. More specifically, antenna array 21 includes receiving loop antennas 22, 23 and 24 (denoted U,V,W) coupled sequentially to signal amplifiers 25, 26 and 27, respectively, frequency translators 55, 56 and 57, respectively, and signal processors 58, 59 and 60, respectively.

Landing aid system 10 operates "open loop" in that the only communication between airborne components 20 and ground based components 30 is the radiated electromagnetic field from ground based components 30. There need be no communication from airborne components 20 to ground based components 30 in order to establish the position and orientation of receiving antenna array 21 with respect to ground antenna array 40. Further, landing aid system 10 allows simultaneous use by any number of remote users. In addition to providing the capability for measuring position and orientation, the signals radiated by ground antenna array 40 can provide a one-way data link from ground based components 30 to receiving antenna array 21. The link can carry information such as transmitter identification, field strength, field distortion corrections, locations of nearby obstacles, the location of the landing site relative to ground antenna array 40 and wind direction.

Figure 2:
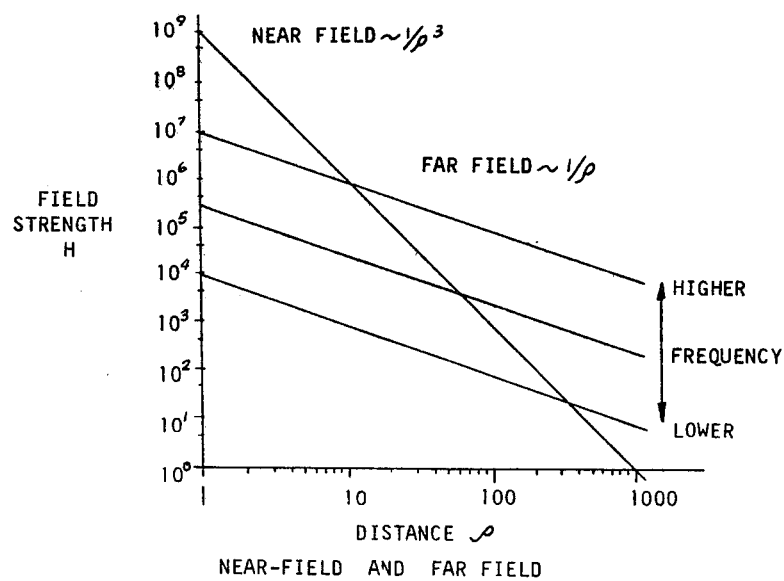
FIG. 2 is a graphical representation showing the relationship between magnetic field strength and distance from a radiator.

Referring to FIG. 2, it is illustrated that the field produced by excitation of a loop antenna can be separated into two components typically referred to as near-field and far-field components. In accordance with an embodiment of this invention, the separation distance of the remote object from the transmitting means is limited to a range in which the near-field component of the electromagnetic field dominates. The far-field component decreases linearly with the distance from the antenna. Its intensity depends on the relative size of the antenna and the wave length of the excitation frequency, and it is the far-field component which is used for long distance communications and navigation. The near-field component decreases with the cube of the distance from the antenna, which prevents its detection at large distances. Advantageously, near-field signals can be of low frequencies which have the ability to penetrate many materials and objects such as soil, trees and water much more easily than do high frequencies. In free space, low frequency electromagnetic fields conform to theoretical predictions based on a simple magnetic dipole. However, some field distortion does occur because of surrounding objects. The amount of distortion resulting from surrounding objects depends on the conductivity and permeability of these objects and their size and location relative to the receiving and transmitting antennas. It is possible to predict and compensate for the distortion caused by nearby fixed objects and hence essentially remove position and orientation errors caused by these objects.

Ground based components 30 generate a near-field landing aid signal. Signal generator 31 generates the electrical signals to excite each of antennas 41 and 42. The signal must be multiplexed so receiving antenna array 21 can distinguish the electromagnetic radiation from each of the antennas 41 and 42. Additionally, the electrical signal contains information characterizing the phase of the electromagnetic radiation. A simple example would be to use a timing pulse to indicate the zero-crossing at which the signal goes positive. Alternatively, if frequency multiplexing is used, the excitation to each of antennas 41 and 42 is advantageously coherent. That is, periodically all of the signals are going positive simultaneously (see FIG. 6). Additionally, the data frequency determines the spacing between the carrier frequencies, and is thus the basic reference frequency of signal generator 31. The data frequency is labeled $f_o$ in FIG. 6. Advantageously, the reference frequency will be derived from a temperature compensated crystal oscillator in the 5 MHz range and frequency selection will be in 10 Hz steps.

The set of power amplifiers 32 and 33 boosts the outputs of signal generator 31 to a level sufficient to produce the desired magnetic moment with the given antenna. To make efficient use of the power available, a switching power amplifier may be used. For example, either class D (carrier frequency switching) or class S (high frequency switching) amplification can be used. An RFI filter is advantageously also included.

Ground antenna array 40 includes mutually orthogonal loop antennas 41 and 42 and may be buried in the landing pad or located on the surface nearby. The relationship of the landing pad to ground antenna array 40 can be included in the one-way data stream to airborne components 20. Antenna design involves trade-offs among number of turns, current and size, as well as the related parameters of input impedance, weight, and driving power. The far-field signal produced and the radiation resistance are negligible and all power required is dissipated in the wire resistance.

In an example of an embodiment of this invention, loop antennas 41 and 42 each produce a magnetic moment of 400 $A \cdot m^2$, a typical radius of the loop antenna is one meter and a typical ampere turns (NI) magnitude is 800. Since there are an infinite number of combinations of amperes and turns which will produce 800 ampere-turns, the choice of N and I can be used to select a convenient input resistance and weight. This selection can be made using standard wire tables, or by using density and resistivity information. A practical, general purpose design thus determined is to use 20 turns with a driving current of 40 amperes (peak). The use of #6 aluminum wire will produce a resistance of about 0.25 ohms resulting in a power dissipation of about 198 Watts. The reactance due to a 0.5 $\mu$H inductance can be neutralized by a series capacitor. A single loop will weigh 4.5 kg, and the array of two antennas will thus weigh 9 kg, neglecting the supporting structure.

Of course, other configurations can be made for other particular applications. For example, in a fixed, permanent installation, it would be preferable to increase the weight of the array to, for example, 90 kg, thus reducing the resistance hence power requirement to about 20 Watts per antenna or about 40 Watts total.

Monitor receiver 44 is similar to an airborne receiver, omitting the apparatus for position/orientation computations, data decoding, and display. Its function is to make sure that electromagnetic field amplitudes and phases radiated from ground antenna array 40 are as desired. When deviations are found, change instructions are issued to the signal generator. If the signals transmitted cannot be maintained within prescribed tolerances, the monitor can place an out-of-tolerance message in that data stream. Of course, it can be appreciated that monitor receiver 44 is not necessary to an embodiment of this invention.

Figure 7:
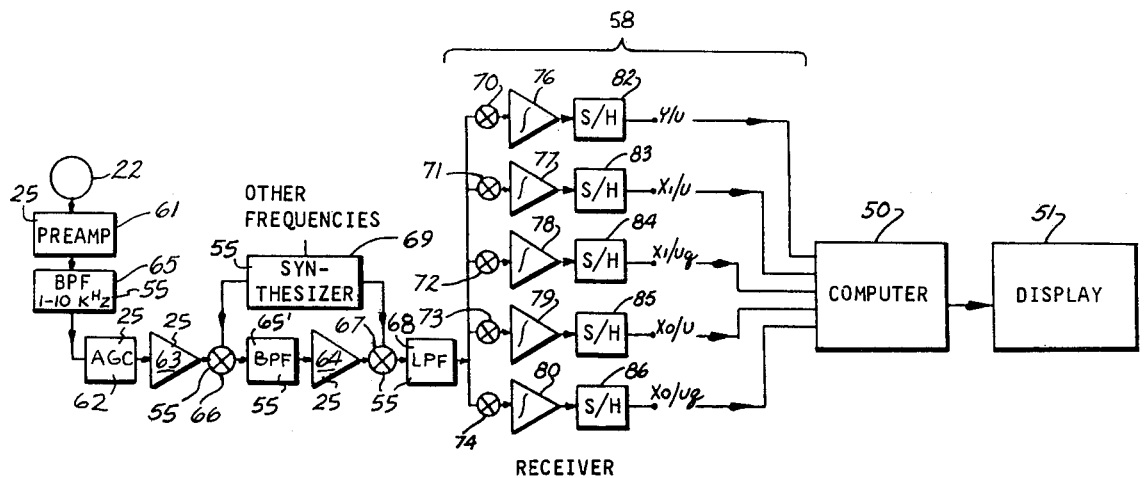
FIG. 7 is a block diagram of a portion of the receiver in accordance with an embodiment of this invention.

Airborne components 20 of landing aid system 10 for a frequency division multiplexing embodiment are shown in FIG. 1. The system illustrated in FIG. 1 includes a separate signal processing path for each of the signals from from receiving loop antennas 22, 23 and 24. Although there is additional discussion of various multiplexing alternatives in U.S. Pat. No. 4,054,881, which is hereby incorporated by reference, it can readily be appreciated that if time division multiplexing were used, a single signal path could be switched among antennas 22, 23 and 24. FIG. 7 shows a more detailed block diagram of a signal path, in particular the U antenna signal path.

Referring now also to FIG. 7, for practical reasons, amplifier group 52 and frequency translator group 53 are broken into several components and spread throughout the signal path. More specifically, U amplifier 25 of amplifier group 52 includes a preamplifier 61, gain control 62, amplifier clipper 63 and amplifier clipper 64. Frequency translator 55 of frequency translator group 53 includes band pass filters 65 and 65', mixer 66, mixer 67, low pass filter 68 and synthesizer 69. Accordingly, receiving loop antenna 22 is sequentially coupled to preamplifier 61, band pass filter 65, gain control 62, amplifier clipper 63, mixer 66, band pass filter 65, amplifier clipper 64, mixer 67 and low pass filter 68. Synthesizer 69 is connected to mixers 66 and 67. The output of low pass filter 68 is connected to signal processor 58.

Signal processor 58 includes parallel combinations of the sequential connection of a mixer, an integrator and a sample-and-hold block. More specifically, each of the parallel paths has a mixer 70 through 74, integrators 76 through 80 and sample-and-hold blocks 82 through 86. The outputs from sample-and-hold blocks 82 through 86 are coupled to computer 50 and in turn coupled to display 51. In this embodiment, there are five parallel paths for processing the signal from the U antenna. There is one path for signals received from the Y transmitting antenna received by the U receiving antenna, denoted Y/U. The transmitted signal from X antenna has two frequencies for carrying a binary code and requires two paths, denoted $X_1/U$ and $X_0/U$. Further, during acquisition two additional signals are processed so data transmitted by the X antenna is not lost. These signals paths are denoted $X_1/Uq$ and $X_0/Uq$ and are used for phase-locking the receiver and transmitter. These signals have negligible output when the receiver is locked on the transmitted frequencies.

The metal aircraft upon which receiving antenna array 21 is mounted causes some distortion of the magnetic fields received by the antenna. Unless the aircraft is very close to the transmitter, this distortion may be described by a linear transformation which maps the free space fields into three antennas 22, 23 and 24. For example, a field aligned exactly with the length of the aircaft will also appear in the transverse and vertical receiving antennas. This effect is constant for a given aircraft and installation. It is easily corrected by applying an inverse linear transformation to the measured data.

The input bandwidth of amplifier group 52 is advantageously restricted to the 1 to 10 kHz band, after which the signals are boosted to a suitable level and noise impulses are clipped. Accurate gain control is used to obtain maximum effectiveness in clipping the VLF-ULF noise. Alternatively, an impulse detector may be applied at this point to shut off amplifier 25 when an impulse occurs. The signal is now translated upward to a convenient intermediate frequency such as 455 kHz. The bandwidth is first reduced to 1 kHz and then to 100 Hz, with clipping each reduction. After the final amplification and clipping, the signal is translated downward to approximately 1 kHz for final processing.

The mixing frequencies required to accomplish the necessary frequency translation are synthesized by standard techniques. The first mixing frequency is selectable in 10 Hz steps from 456 to 465 kHz. This allows any selected signal in the 1 to 10 kHz band to be translated to 455 kHz. The second mixing frequency of 456 kHz is fixed and translates the 455 kHz intermediate frequency to the 1 kHz processing frequency. For initial acquisition, these frequencies are synthesized from a stable reference oscillator. After acquisition, using the $X_1/Uq$ and $X_0/Uq$ outputs, they can be locked to the received signal to remove any frequency error.

Signal processor group 54 must acquire the received signals, establish the timing reference, make measurements for position/orientation computations, and decode transmitted data. To do this, it uses a series of phase-locked loops, frequency dividers, and integrators. Interface with computer 50 is accomplished by an A/D converter and a suitable buffer. Signal acquisition is accomplished by the equivalent of a pair of phase-locked loops. In this particular example, as stated, frequency multiplexing is used and data is carried only by one radiating antenna (the X signal shown in FIG. 6). The frequencies for carrying data, i.e. ones and zeros, on the X signal are referred to as the mark and space frequencies. Accordingly, the phase-locked loops can operate at, for example 1000 and 1010 Hz, to correspond to the mark and space frequencies of the X signal. Loop bandwidth may be changed for initial acquisitions and later tracking, but in either case, it will be sufficiently low to cause the loop to ignore the effects of the frequency shift keying. The 10 Hz reference timing is obtained as the difference between the frequencies of the two oscillators generating the mark and space frequencies. Actual implementation can use measurements of both the sine and cosine integrals for measurement and locking, respectively.

Signal measurements are made by mixing a received signal with a locally generated signal and integrating the product. A coherent set of mixing frequencies (for example, 1020, 1010, and 1000 Hz) corresponding to the three transmitting frequencies is synthesized from the 10 Hz reference frequency. The integrators 76–80 are advantageously reset about every 0.1 second by the reference signal. The value in each of the integrators is transferred to sample-and-hold circuits 82–86 just prior to the resetting of integrators 76–80.

Decoding of the data and averaging of the measurements is accomplished by software. Computer 50 can measure signal amplitude and signal-to-noise ratio on a sample-by-sample basis. Navigation measurements of the Y signal is accomplished simply by summing an appropriate number of 0.1 second samples. A similar procedure is used on the X channel for initial acquisition. When measurements indicate a satisfactory signal-to-noise ratio, data may be extracted by comparing the X-mark samples to the X-space samples, X-navigation information is based on an average of those samples corresponding to the data received. That is, only the X-mark or X-space sample at a given sampling point is used, depending on the decision about which carrier was transmitted during that interval.

The antenna, preamplifier, computer and display can be common to both landing aid system 10 and Loran-C, Omega or VLF navigation systems. This is particularly advantageous for reducing cost and for simplification of equipment. Further, an aircraft may use Loran-C or Omega to navigate to within a few kilometers of the landing point and then acquire landing aid system 10 signals and use them for final approach guidance. The computer and display can be anything suitable and are therefore not discussed here in detail.

Landing Aid System Three State Excitation

Although FIGS. 1 and 7 detail a landing aid system utilizing two transmitting antennas, 41 and 42, and three receiving antennas, 22, 23 and 24, a landing aid system 10a (FIG. 8) utilizing three transmitting antennas, 41, 42 and 43, and two receiving antennas 22 and 23, is considered within the scope of the present invention and is herein presented as an alternate embodiment.

Figure 8:
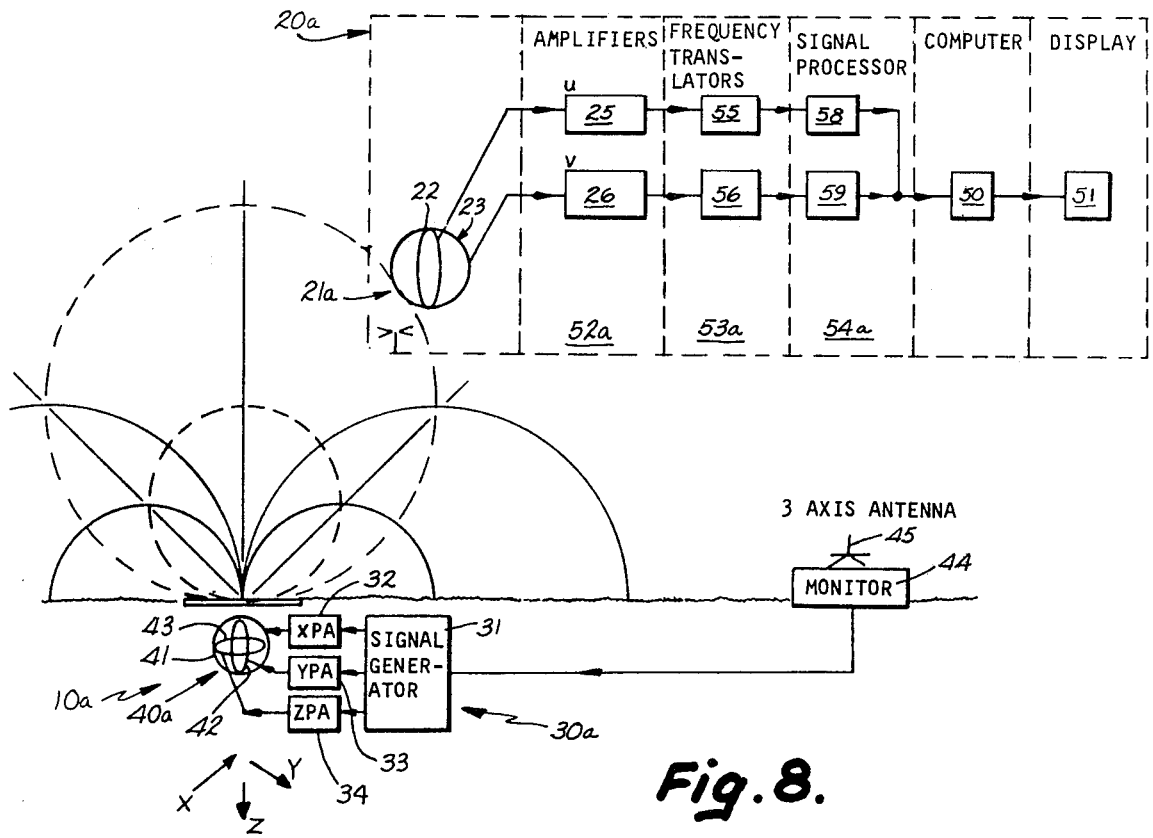
FIG. 8 is a partly block, side elevational view of a landing aid system in accordance with an alternate embodiment of this invention.

Referring to FIG. 8, a landing aid system 10a, includes ground based components 30a for radiating an electromagnetic field and airborne components 20a for receiving the electromagnetic field and determining the position and orientation of airborne components 20a with respect to ground based components 30a. Ground based components include a signal generator 31 coupled in parallel to power amplifiers 32, 33 and 34. A ground antenna array 40a includes orthogonal loop antennas 41, 42 and 43 (denoted X,Y,Z) coupled to power amplifiers 32, 33 and 34, respectively. A monitor receiver 44 is coupled to signal generator 31, spaced from ground antenna array 40a and has an orthogonal antenna array 45 for receiving electromagnetic radiation from ground antenna array 40a. Monitor receiver 44 provides a means of verifying the electromagnetic transmission from ground antenna array 40a. Airborne components 20a include a two-axis receiving antenna 21a consisting of mutually orthogonal elements 22 and 23; and two identical channels of amplification (25 and 26), frequency translation (55 and 56) and signal processing (58 and 59). The two signal-processor outputs are sequentially coupled to the computer 50, which determines the position and orientation for display at 51. More specifically, antenna array 21a includes receiving loop antennas 22 and 23 (denoted U,V) coupled sequentially to signal amplifiers 25 and 26, respectively, frequency translators 55 and 56, respectively, and signal processors 58 and 59, respectively. The use of two receiving antennas 22 and 23, as opposed to three receiving antennas, increases the simplicity of the receiver 20a.

Figure 9:
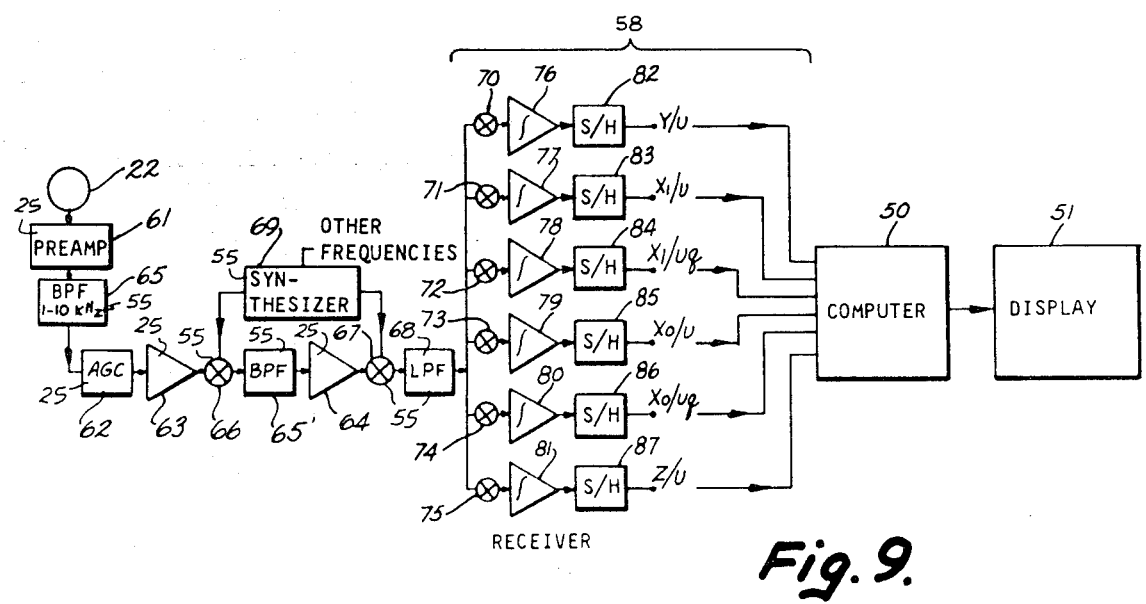
FIG. 9 is a block diagram of a portion of the receiver in accordance with an alternate embodiment of this invention.

Airborne components 20a of landing aid system 10a for a frequency division multiplexing embodiment are shown in FIG. 8 and have a separate signal processing path for each of the signals from receiving loop antennas 22 and 23. It can readily be appreciated that if time division multiplexing were used, a single path could be switched among antennas 22 and 23. FIG. 9 shows a more detailed block diagram of a signal path, in particular the U antenna signal path.

For practical reasons, amplifier group 52a and frequency translator group 53a are broken into several components and spread throughout the signal path. More specifically, U amplifier 25 of amplifier group 52a includes a preamplifier 61, gain control 62, amplifier clipper 63 and amplifier clipper 64. Frequency translator 55 of frequency translator group 53a includes band pass filter 65, mixer 66, mixer 67, low pass filter 68 and synthesizer 69. Accordingly, receiving loop antenna 22 is sequentially coupled to preamplifier 61, band pass filter 65, gain control 62, amplifier clipper 63, mixer 66, band pass filter 65, amplifier clipper 64, mixer 67 and low pass filter 68. Synthesizer 69 is connected to mixers 66 and 67. The output of low pass filter 68 is connected to signal processor 58.

Signal processor 58 includes parallel combinations of the sequential connection of a mixer, an integrator and a sample-and-hold block. More specifically, each of the parallel paths has a mixer 71 through 75, integrators 76 through 81 and sample-and-hold blocks 82 through 87. The outputs from sample-and-hold blocks 82 through 87 are coupled to computer 50 and in turn coupled to display 51. In this embodiment, there are six parallel paths for processing the signal from the U antenna. There is one path for signals received from the Y transmitting antenna received by the U receiving antenna, denoted Y/U. Similarly, there is one path for signals received from the Z transmitting antenna received by the U receiving antenna, denoted Z/U. The transmitted signal from X antenna has two frequencies for carrying a binary code and requires two paths, denoted $X_1/U$ and $X_0/U$. Further, during acquisition two additional signals are processed so data transmitted by the X antenna is not lost. These signals paths are denoted $X_1/Uq$ and $X_0/Uq$ and have negligible output when the receiver is locked on the transmitted frequencies. The only difference between FIG. 7 and 9 is the additional Z/U path necessitated by the additional transmitting antenna.

It can be appreciated that the more detailed discussion of FIGS. 1 and 7 with respect to radiated fields, multiplexing, decoding of data, averaging of measurements, distortion, information contained in the signal, and system design in general is directly applicable to the alternate embodiment and will not be repeated here.

Underground Position And Orientation Determining System

Figure 10:
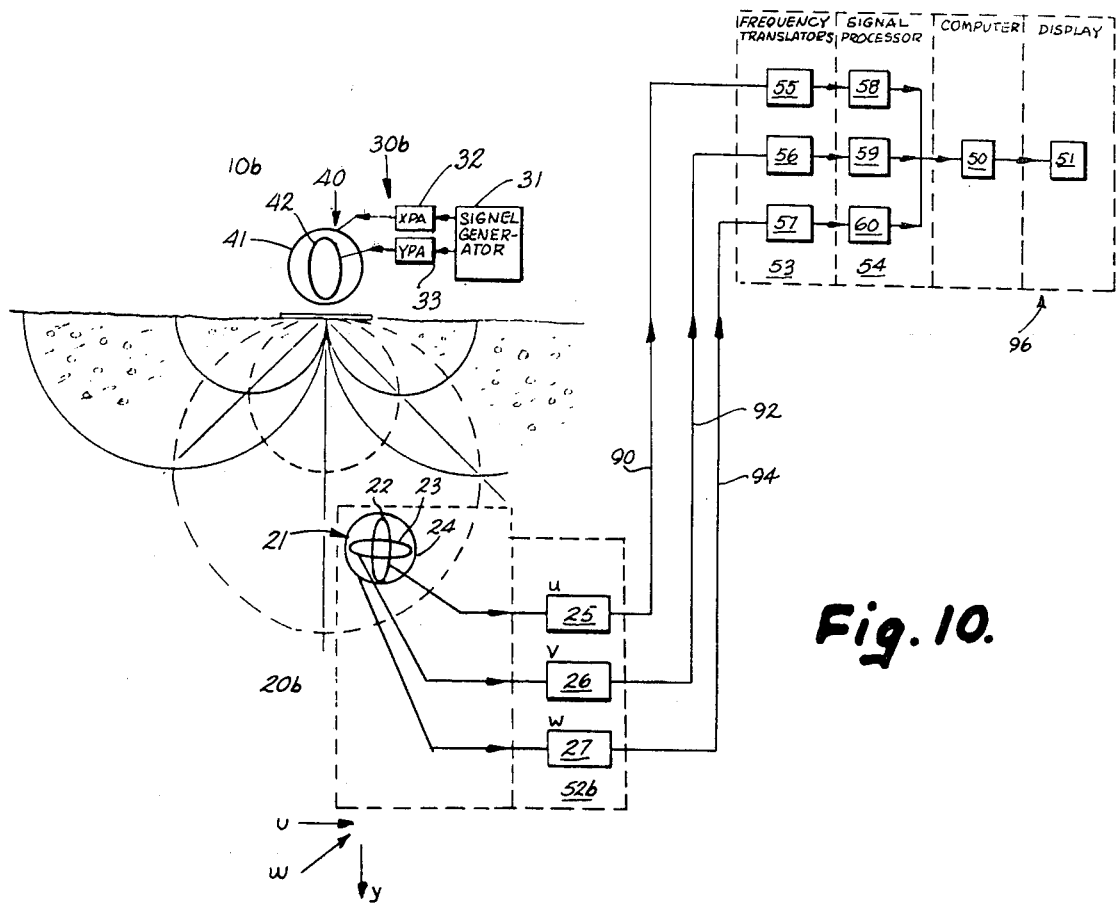
FIG. 10 is a partly block, side elevational view of a remotely controlled underground drill system constructed according to an embodiment of the present invention.

Referring to FIG. 10 a further alternate embodiment, illustrating a different use for the hardware illustrated in FIGS. 1 and 7, is a remotely controlled underground drill system 10b. In such a system, ground based components 30b radiate an electromagnetic field and subsurface drill based components 20b receive the electromagnetic field. The received electromagnetic field is then amplified by subsurface amplifiers 52b, and relayed to the surface processing components 96 by conventional telemetry techniques along lines 90, 92 and 94. A monitor similar to monitor 44 of FIG. 1 could be included but is not necessary.

Comparing FIG. 10 with FIG. 1 illustrates that except for telemetry lines 90, 92 and 94, the hardware used to implement the system is the same. It is understood, of course, that since transmission is through the ground in the remotely controlled underground drill system 10b, rather than through the air as in the landing aid systems 10 and 10a, the transmission frequency for drill system 10b is considerably lower than that used in the landing aid system.

OPERATION

Landing Aid Systems

For illustrative purposes taking the embodiment of the invention illustrated in FIG. 1, geometrical considerations dictate the need for inclusion of a timing reference in the transmitted signal. They also require airborne components 20 to measure the signal components induced in each receiving antenna 22, 23 and 24 by each transmitting antenna 41 and 42. These requirements and any additionally desired data transmission form the constraints on signal format. While many choices are possible, coherent frequency division multiplex/frequency shift keying is advantageous for many general purpose users.

Magnetic Dipole Fields

Figure 3:
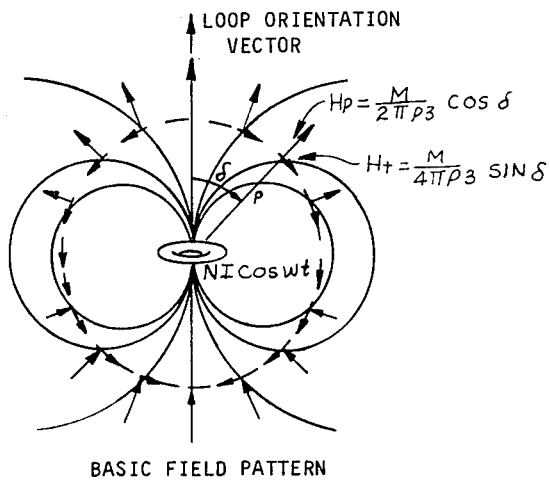
FIG. 3 is a simplified representation of a magnetic field associated with a current carrying closed loop.

Near-field equations may be decomposed into a few relatively simple terms. The use of a suitable multiplexing format allows separate measurements to be made on the signals as received by each of three receiving antennas 22, 23 and 24. The near-field produced by a circular loop antenna can be described in terms of radial and tangential components, as shown in FIG. 3. Although the antennas need not be circular they should be magnetic-dipole sources. The transmitting antennas 41 and 42 and receiving antennas 22, 23 and 24, should have diameters which are small (assuming they are loop antennas) in comparison to the distance separating them. They can therefore be regarded as point sources and point sensors. The wavelength of the excitation signal should also be long enough ($\rho << \lambda/2\pi$) so that only the near-field or quasi-static field component is significant.

Suppose now that the loop shown in FIG. 3 is excited with a current $i(t) = I \cos \omega t$. The magnetic field produced at a point of distance $\rho$ and off-axis angle $\delta$ is described completely by radial and tangential components:

$$H_\rho = M/2\pi\rho^3 \cos \delta \quad (1)$$

and $$H_t = M/4\pi\rho^3 \sin \delta \quad (2)$$

Here $M = NIA$ is called the magnetic moment of the loop, and A and N represent the area and number of turns of the loop. A $\cos \omega t$ time variation is implicit in the above equations. The above characterization is valid for a loop of any shape as long as the distance $\rho$ is more than about four times the radius of the loop. An analysis of equations 1 and 2 shows that although the near field changes in both amplitude and orientation with changes in the orientation angle $\delta$, the amplitude of the near field is not frequency dependent as is the amplitude in the intermediate and far-field. Note that in reception, a loop antenna responds only to the field component aligned with the loop orientation vector (i.e., perpendicular to the plane of the loop).

Geometry

Figure 4:
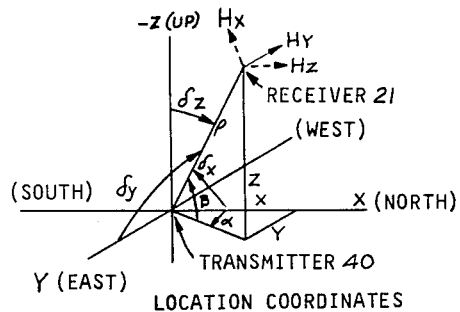
FIG. 4 is a graphical representation of the location coordinate system of the remote object with respect to the location of the origin of the reference coordinate frame.

A coordinate system for determination of the position of the receiver relative to the transmitter is shown in FIG. 4. The X, Y and Z axes are aligned with north, east, and vertical, respectively, and are centered at the center of transmitting ground antenna array 40. Location of receiving antenna array 21 may be specified in either rectangular coordinates (x,y,z) or in polar coordinates as a ($\rho$, $\alpha$, $\beta$). It may also be specified by the distance $\rho$ and two of the three direction angles $\delta_x$, $\delta_y$, or $\delta_z$.

Measurement of the two transmitted signals from ground antenna array 40 as received by the set of three orthogonal receiving antennas 22, 23 and 24 produces information which is sufficient to determine the six position and orientation parameters. As noted earlier, this assumes two orientation or position parameters are independently determined. While there are a variety of computational algorithms that can be used, it is conceptually easiest to begin by using relative amplitudes to determine position. The first step in synthesizing a position-and-orientation-finding algorithm is the definition of coordinates and vector-matrix formulation relating sensor output to source excitation. Although the landing aid system 10 of the present embodiment of the invention utilizes two transmitting antennas and three receiving antennas, it will be remembered that an alternate embodiment of a landing aid system 10a, illustrated in FIG. 8, utilizes three transmitting antennas and two receiving antennas. To facilitate generalizing to the above systems, a position and orientation finding algorithm will first be developed for a system with three transmitting antennas (as in landing aid system 10a) and three receiving antennas (as in landing aid system 10). It should also be noted that in order to facilitate the orderly development of a position-and-orientation-finding algorithm, in FIG. 5, the three transmitting antennas 41, 42 and 43 of landing aid system 10a will be designated a three-axis source 98 and the three receiving antennas 22, 23 and 24, of landing aid system 10 will be designated a three-axis sensor 100.

Figure 5:
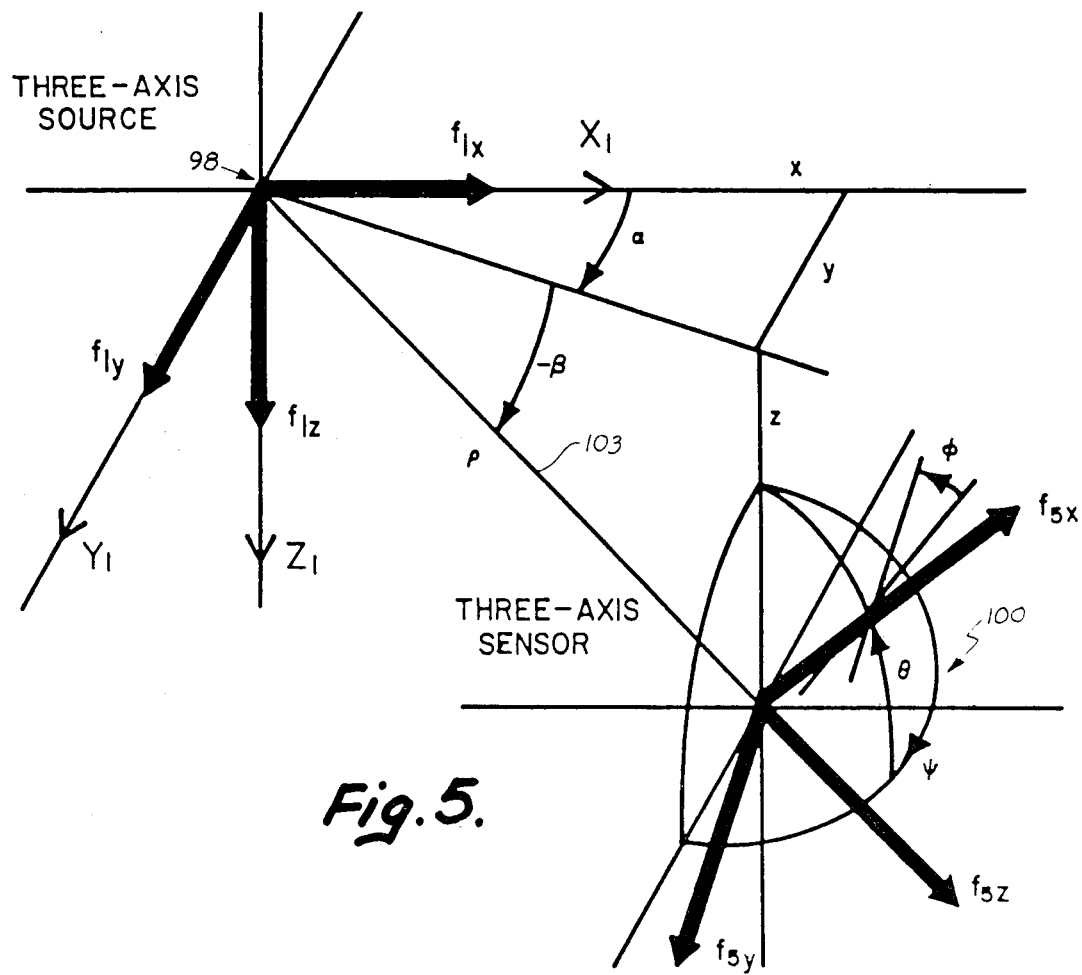
FIG. 5 is a graphical representation of the orientation and position coordinate system of the remote object with respect to the reference coordinate frame.

The geometric relationship between a three-axis source 98 and a three-axis sensor 100 is shown in FIG. 5. The source coordinate frame $X_1$-$Y_1$-$Z_1$ is defined by the axes of the source 98. Alignment of these axes with some convenient natural reference such as north, east and down is assumed. The source axes can be effectively aligned with any desired coordinate frame by altering the excitation. Similarly, coordinates measured in the source coordinate frame can be converted to any desired coordinate frame mathematically.

The sensor position is specified in rectangular (x, y, z) or spherical ($\alpha$, $\beta$, $\rho$) coordinates defined relative to the source coordinate frame. Sensor orientation is specified by a sequence of three rotations. Azimuthal rotation by $\psi$ first turns the sensor about its Z axis from +X toward +Y. The elevation rotation by θ then turns the sensor about its Y axis from +X to −Z. Finally, a roll rotation by φ turns the sensor 100 about its X axis from +Y to +Z. Note that in the zero-orientation condition, the three sensor axes are parallel to the corresponding source axes, and that the order of the rotations cannot be interchanged without changing the values of ψ, θ, and φ.

Vector Representation of Source-Sensor Coupling

The excitation of a three-axis magnetic dipole source 98 and the resultant three-axis sensor output are most conveniently described in vector notation. The excitation of the source 98 is therefore represented by $\underline{f}_1 = [f_{1x}, f_{1y}, f_{1z}]^T$. The number of turns and area of the three source loops 41, 42 and 43 of FIG. 8 for example, are assumed to be identical, hence $f_{1x}$, $f_{1y}$, and $f_{1z}$ represent the amplitude of the currents exciting the loops of X-axis, Y-axis, and Z-axis orientation, respectively. It is also convenient to let the output of a three-axis sensor 100 be similarly represented by $\underline{f}_5 = [f_{5x}, f_{5y}, f_{5z}]^T$.

Figure 11:
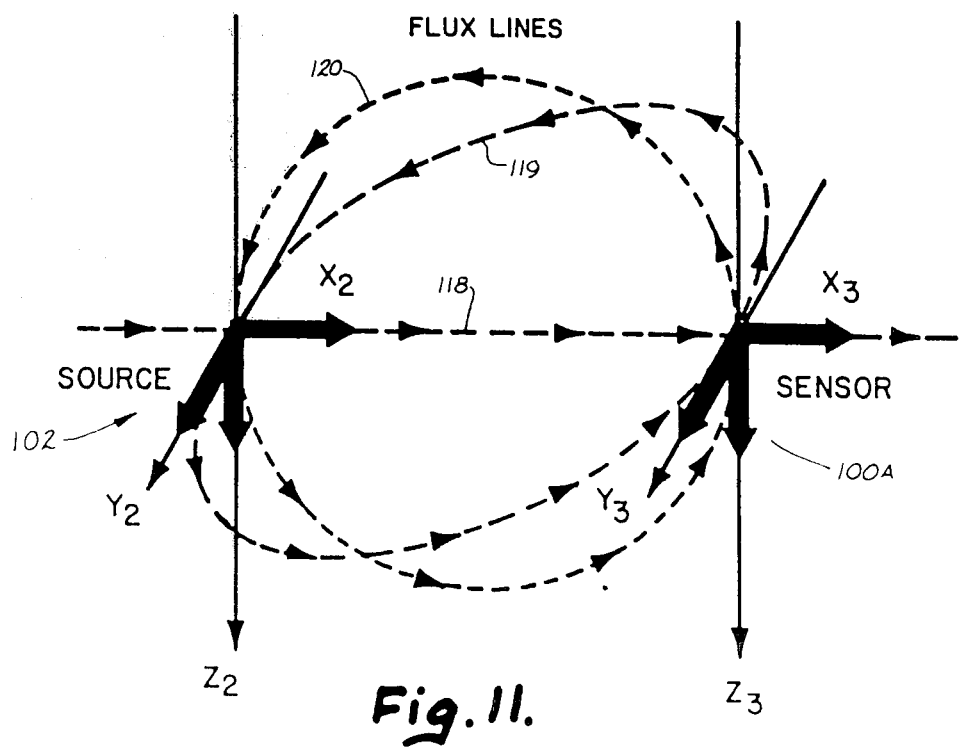
FIG. 11 is a graphical representation of the flux lines connecting the axes of a source with a similarly aligned sensor.

FIG. 11 illustrates a similarly aligned source and sensor. The excitation of source 102 is designated $\underline{f}_2$, and the corresponding output of sensor 100A is designated $\underline{f}_3$. In FIG. 11, each source axis $X_2$, $Y_2$ and $Z_2$ is coupled only to the corresponding sensor axis $X_3$, $Y_3$, and $Z_3$, respectively, by flux lines 118, 119 and 120, respectively. Furthermore, since the $Y_2$-$Y_3$ and $Z_2$-$Z_3$ couplings are produced by tangential field components, their amplitudes differ by a factor of $-\frac{1}{2}$ from the $X_2$-$X_3$ coupling which is produced by a radial field component. The coupling can be described completely in vector-matrix form by:

$$\underline{f}_3 = \frac{C}{\rho^3} S \underline{f}_2 = \frac{C}{\rho^3} \begin{bmatrix} 1 & 0 & 0 \\ 0 & -\frac{1}{2} & 0 \\ 0 & 0 & -\frac{1}{2} \end{bmatrix} \underline{f}_2 \quad (3)$$

where C=NAG/2π incorporates sensor gain G and the common source factor NA/2π.

Effects of Position and Orientation

The coupling between a source 98 and sensor 100 of arbitrary position and orientation can be determined by inserting orthogonal rotation matrices into equation (3). These matrices are based upon position azimuth and elevation (α and β) and orientation azimuth, elevation, and roll (ψ, θ, and φ), as shown in Table 1. Note that the subscript defines both the type of transformation and its independent variable.

TABLE 1

ORTHOGONAL ROTATION MATRICES

| | Position | Orientation |
|---|---|---|
| Azimuth rotates X into Y | $\underline{T}_\alpha = \begin{bmatrix} \cos\alpha & \sin\alpha & 0 \\ -\sin\alpha & \cos\alpha & 0 \\ 0 & 0 & 1 \end{bmatrix}$ | $\underline{T}_\psi = \begin{bmatrix} \cos\psi & \sin\psi & 0 \\ -\sin\psi & \cos\psi & 0 \\ 0 & 0 & 1 \end{bmatrix}$ |
| Elevation rotates X into −Z | $\underline{T}_\beta = \begin{bmatrix} \cos\beta & 0 & -\sin\beta \\ 0 & 1 & 0 \\ \sin\beta & 0 & \cos\beta \end{bmatrix}$ | $\underline{T}_\theta = \begin{bmatrix} \cos\theta & 0 & -\sin\theta \\ 0 & 1 & 0 \\ \sin\theta & 0 & \cos\theta \end{bmatrix}$ |
| Roll rotates Y into Z | not applicable | $\underline{T}_\phi = \begin{bmatrix} 1 & 0 & 0 \\ 0 & \cos\phi & \cos\phi \\ 0 & -\sin\phi & \sin\phi \end{bmatrix}$ |
| Inverses | $\underline{T}_\alpha^{-1} = \underline{T}_{-\alpha}$, $(\underline{T}_\beta \underline{T}_\alpha)^{-1} = \underline{T}_{-\alpha}\underline{T}_{-\beta}$ | |

Consider first the coupling between the source 98 and a zero-orientation sensor (whose output is $f_4$) located at (α, β, ρ), as shown in FIG. 5. The excitation $\underline{f}_2$ of an equivalent source 102 whose X-axis is aligned with the line 103 connecting the source 98 and sensor 100 can be determined by rotating the excitation vector of the real source 98 by position azimuth and elevation, thus:

$$\underline{f}_2 = \underline{T}_\beta \underline{T}_\alpha \underline{f}_1 \quad (4)$$

The coupling to a similarly aligned equivalent sensor $f_3$ then has the same form as (3), i.e., $f_3 = (C/\rho^3)\underline{S}\underline{f}_2$. The output of the zero-orientation sensor is then found by applying inverse position rotations, thus:

$$\underline{f}_4 = C/\rho^3 \underline{T}_{-\alpha}\underline{T}_{-\beta}\underline{S}\underline{T}_\beta\underline{T}_\alpha\underline{f}_1 = C/\rho^3 \underline{Q}\underline{f}_1 \quad (5)$$

The equivalent sources and sensors used above are listed in Table 2.

TABLE 2

VECTOR DEFINITIONS.

| SYMBOL | NAME | DEFINITION |
|---|---|---|
| $f_1$ | Source | — |
| $f_2$ | Position-frame source | $\underline{f}_2 = \underline{T}_\beta \underline{T}_\alpha \underline{f}_1$ |
| $f_3$ | Position-frame sensor | $\underline{f}_3 = \frac{C}{\rho^3} S \underline{f}_2$ |
| $f_4$ | Zero-orientation sensor | $\underline{f}_4 = \underline{T}_{-\alpha}\underline{T}_{-\beta}\underline{f}_3$ |
| $f_5$ | Sensor | $\underline{f}_5 = \underline{T}_\phi \underline{T}_\theta \underline{T}_\psi \underline{f}_4$ |

The output of three-axis sensor 100 of arbitrary orientation (ψ, θ, φ) is determined by applying orientation azimuth, elevation, and roll rotations to the output of the equivalent zero-orientation sensor, thus:

$$\underline{f}_5 = \underline{T}_\phi \underline{T}_\theta \underline{T}_\psi \underline{f}_4 = \underline{A}\underline{f}_4 \quad (6)$$

These expressions will be used subsequently to derive position-and-orientation-finding algorithms.

Excitation States

Determination of position and orientation in general requires sensor outputs corresponding to two or three linearly independent source excitation vectors. The source and sensor vectors produced during different excitation states are denoted by an attached parenthesized excitation-state symbol. The three source excitation vectors used in this analysis correspond to the source axes, hence:

$$\underset{\sim}{f}_1(S1) = \begin{bmatrix} 1 \\ 0 \\ 0 \end{bmatrix}, \underset{\sim}{f}_1(S2) = \begin{bmatrix} 0 \\ 1 \\ 0 \end{bmatrix}, \text{ and } \underset{\sim}{f}_1(S3) = \begin{bmatrix} 0 \\ 0 \\ 1 \end{bmatrix} \quad (7)$$

the set of two or three of these excitation vectors constitutes an excitation pattern. The corresponding sensor outputs are similarly denoted by $\underset{\sim}{f}_5(S1)$, $\underset{\sim}{f}_5(S2)$, and $\underset{\sim}{f}_5(S3)$, respectively. Operation with other excitation states is readily reduced to operation with this set of basis vectors.

POSITION DETERMINATION

Three-axis sensing determines the complete signal vector produced at the sensor location by each excitation vector. Since the sensor orientation is unknown initially, position is determined from signal parameters that are unaffected by sensor orientation unknowns and therefore greatly simplifies the system of trigonometric equations.

Orientation-Invariant Parameters

The field vectors produced at the sensor location (equivalently, the output vectors of a zero-orientation sensor, such as the sensor 100A in FIG. 11) are transformed into the outputs of the true sensor (such as the sensor 100 of arbitrary position and orientation in FIG. 5) by a sequence of orthogonal rotations, which preserve vector length and relative angle. Solutions for the unknown position of the sensor 100 are therefore formulated in terms of squared magnitudes and the dot products of sensor output vectors, both of which are invariant under sensor orientation.

Since the desired parameters are independent of sensor orientation, it is most convenient to derive them from the unobservable output of an equivalent position-frame sensor. Using equations (3) and (4) and Table 1 produces:

$$\underset{\sim}{S} \underset{\sim}{T}_\beta \underset{\sim}{T}_\alpha = \begin{bmatrix} \cos\alpha\cos\beta & \sin\alpha\cos\beta & -\sin\beta \\ (\tfrac{1}{2})\sin\alpha & -(\tfrac{1}{2})\cos\alpha & 0 \\ -(\tfrac{1}{2})\cos\alpha\sin\beta & -(\tfrac{1}{2})\sin\alpha\sin\beta & -(\tfrac{1}{2})\cos\beta \end{bmatrix} \quad (8)$$

The position-frame sensor-output vectors corresponding to the excitation vectors of (7) are then:

$$\underset{\sim}{f}_3(S1) = \frac{C}{\rho^3} \begin{bmatrix} \cos\alpha\cos\beta \\ (\tfrac{1}{2})\sin\alpha \\ -(\tfrac{1}{2})\cos\alpha\sin\beta \end{bmatrix} \quad (9)$$

$$\underset{\sim}{f}_3(S2) = \frac{C}{\rho^3} \begin{bmatrix} \sin\alpha\cos\beta \\ -(\tfrac{1}{2})\cos\alpha \\ -(\tfrac{1}{2})\sin\alpha\sin\beta \end{bmatrix} \quad (10)$$

and $$\underset{\sim}{f}_3(S3) = \frac{C}{\rho^3} \begin{bmatrix} -\sin\beta \\ 0 \\ -(\tfrac{1}{2})\cos\beta \end{bmatrix} \quad (11)$$

Three State Excitation

An ambiguous position estimate ($|x|, |y|, |z|$) can be determined through a simple system of equations based upon the outputs of a three-axis sensor 100 produced by all three excitation vectors in (7). Consider the squared vector magnitude produced by Z-axis (state S3) excitation of the source 98; from (11):

$$P(S3) = \frac{C^2}{\rho^6}[\sin^2\beta + (\tfrac{1}{4})\cos^2\beta] \quad (12)$$

Substitution of $\sin^2\beta = z^2/\rho^2$ and $\cos^2\beta = (x^2+y^2)/\rho^2$ into equation (12) then produces:

$$P(S3) = \frac{C^2}{\rho^8}[(\tfrac{1}{4})x^2 + (\tfrac{1}{4})y^2 + z^2] \quad (13)$$

Application of geometric analogies and the normalizations $X = Cx/\rho^4$, $Y = Cy/\rho^4$, and $Z = Cz/\rho^4$ to equation (13) produces a system of three linear equations:

$$P(S1) = X^2 + (\tfrac{1}{4})Y^2 + (\tfrac{1}{4})Z^2 \quad (14)$$

$$P(S2) = (\tfrac{1}{4})X^2 + Y^2 + (\tfrac{1}{4})Z^2 \quad (15)$$

$$P(S3) = (\tfrac{1}{4})X^2 + (\tfrac{1}{4})Y^2 + Z^2 \quad (16)$$

Estimates of the squared, normalized position coordinates are given by:

$$\begin{bmatrix} \hat{X}^2 \\ \hat{Y}^2 \\ \hat{Z}^2 \end{bmatrix} = \frac{2}{9} \begin{bmatrix} 5 & -1 & -1 \\ -1 & 5 & -1 \\ -1 & -1 & 5 \end{bmatrix} \begin{bmatrix} P(S1) \\ P(S2) \\ P(S3) \end{bmatrix} \quad (17)$$

Ambiguous position angles ($\hat{\alpha}$ and $\hat{\beta}$) can be determined directly from $|\hat{X}|, |\hat{Y}|$, and $|\hat{Z}|$ without denormalization. The data impressed upon the transmitted signal can advantageously include the strength of the transmitter, i.e., its magnetic moment M. Alternatively, independent means such as written tables or other radio communication, can be used to determine the strength of the transmitted field. Once C is known, range $\rho$ is readily estimated, since:

$$\frac{C^2}{\rho^6} = X^2 + Y^2 + Z^2 = \frac{3}{2}[P(S1) + P(S2) + P(S3)] \quad (18)$$

Once $\rho$ has been determined, $|\hat{x}|, |\hat{y}|$, and $|\hat{z}|$ are determined by denormalization.

In addition, further terms can be added to each equation in (17) to account for distortion caused by nearly fixed metallic structures. These terms would be computed using empirical methods.

Ambiguity Resolution

While the magnitudes of the rectangular coordinates are now known, their signs are not known, and there are thus eight mathematically possible locations. Quadrant ambiguity resolution is accomplished using the signs (polarities) of the dot products of the sensor output vectors. The three different dot products corresponding to the three excitation states of equation (7) are from equations (9), (10), and (11):

$$v(S1, S2) = \frac{C^2}{\rho^6} (\tfrac{3}{4} \sin 2\alpha)(\cos^2 \beta) \tag{19}$$

$$v(S2, S3) = \frac{C^2}{\rho^6} (-\tfrac{3}{4} \sin \alpha)(\sin 2\beta) \tag{20}$$

$$v(S3, S1) = \frac{C^2}{\rho^6} (-\tfrac{3}{4} \cos \alpha)(\sin 2\beta) \tag{21}$$

Inspection of Table 3 shows that any two of three dot products remove two of the three quadrant ambiguities. The third dot product is redundant, and the remaining single quadrant ambiguity [e.g., (x, y, |z|)] is inherent in the field structure. It may, however, be resolved by either physical restrictions on position (e.g., z<0) or orientation (e.g., $-90° \leq \phi \leq +90°$). If an orientation restriction is used, choice of the wrong candidate position is detected by an orientation estimate in an unallowed quadrant. If the sensor 100 is located on the $X_1$, $Y_1$, or $Z_1$ axis, all three dot products are zero and therefore, provide no ambiguity resolution information.

TABLE 3

SIGNS OF DOT PRODUCTS

| | Position Coordinates | | | | | Dot Products | | |
|---|---|---|---|---|---|---|---|---|
| Quadrant | x | y | z | α | β | v(S1,S2) | v(S2,S3) | v(S3,S1) |
| 1 | + | + | − | 0° ... 90° | 0° ... +90° | + | − | − |
| 2 | − | + | − | 90° ... 180° | 0° ... +90° | − | − | + |
| 3 | − | − | − | −90° ... −180° | 0° ... +90° | + | + | + |
| 4 | + | − | − | 0° ... −90° | 0° ... +90° | − | + | − |
| 5 | + | + | + | 0° ... 90° | 0° ... −90° | + | + | + |
| 6 | − | + | + | 90° ... 180° | 0° ... −90° | − | + | − |
| 7 | − | − | + | −90° ... −180° | 0° ... −90° | + | − | − |
| 8 | + | − | + | 0° ... −90° | 0° ... −90° | − | − | + |

Two State Excitation

The ambiguous position of a three-axis sensor, such as the sensor 100 illustrated in FIG. 5, with respect to a two-axis source (the embodiment is illustrated in FIG. 1) can be determined from two squared magnitudes and the dot product of the sensor output vectors. Since only one dot product is available, only one of the three quadrant ambiguities can be resolved from the information in the received signals (Table 3). As discussed above, though, these two quadrant ambiguities may be resolved by two physical restrictions on either position or orientation. Suitable parameters to specify are, for example, that an airplane is flying right side up or upside down and that the airplane is approaching a landing site from either the north or south, or the east or west. If the landing aid system is supplied with these parameters, the ambiguities are eliminated.

Suppose that the source has only X and Y axes, as is the case in preferred embodiment of FIG. 1. The squared vector magnitudes are then P(S1) and P(S2), and are given by Equations (14) and (15). The dot product v(S1, S2) given by Equation (19) is converted to normalized rectangular coordinates, thus:

$$v(S1, S2) = \tfrac{3}{4} \frac{C^2}{\rho^6} \cos \alpha \sin \alpha \cos^2 \beta \tag{22}$$

$$= \tfrac{3}{4} \frac{C^2}{\rho^6} \left( \frac{x}{\sqrt{x^2+y^2}} \right) \left( \frac{y}{\sqrt{x^2+y^2}} \right) \left( \frac{x^2+y^2}{\rho^2} \right) = \tfrac{3}{4} X Y$$

Subtraction of equations (15) and (14) eliminates unknown Z, hence:

$$P(S1) - P(S2) = (\tfrac{3}{4})(X^2 - Y^2) \tag{23}$$

Rearrangement of Equation (22) gives unknown Y as a function of unknown X (provided X≠0):

$$Y = (\tfrac{4}{3}) \frac{v(S1, S2)}{X} \tag{24}$$

Substitution of Equation (24) into Equation (23) and rearrangement yields:

$$X^4 - \left\{ \frac{4}{3} [P(S1) - P(S2)] \right\} X^2 - \frac{16}{9} v^2(S1, S2) = 0 \tag{25}$$

The estimate $\hat{X}^2$ is found by solving equation (25) with the quadratic formula; the negative candidate for $\hat{X}^2$ is discarded. Substitution of $|\hat{X}|$ into equation (24) produces $|\hat{Y}|$, and substitution of $|\hat{X}|$ and $|\hat{Y}|$ into either equations (14), or (15) produces $|\hat{Z}|$. Range ρ is then determined from equation (18) and used to denormalize the estimated position coordinates.

Better performance in the presence of noise can generally be obtained by using the sum of equations (14) and (15), thus:

$$\hat{Z}^2 = 2[P(S1) + P(S2)] - \tfrac{5}{4}(\hat{X}^2 + \hat{Y}^2) \tag{26}$$

If v(S1, S2)=0, then either X=0 or Y=0. If P(S1)−P(S2)>0, then Y=0 and equation (23) determines $\hat{X}^2$; otherwise $\hat{X}$=0 and equation (23) determines $Y^2$. In either special case, $\hat{Z}^2$ can be determined from equation (26).

Reciprocity requires that sensor-to-source coupling be the same as source-to-sensor coupling. The position of a two-axis sensor relative to a three-axis source (the alternate embodiment illustrated in FIG. 8) can therefore be determined by forming vectors of the responses of each sensor axis to the three source axes. When these are used in place of the sensor output vectors in the preceding equations, the location of the three-axis source 98 with respect to the sensor 100 will be determined. After orientation has been determined, these position coordinates can be converted to source-frame coordinates.

ORIENTATION DETERMINATION

Sensor orientation can be determined in a noniterative manner from any two sensor output vector corresponding to fields aligned with the source axes. These sensor output vectors are synthesized from the true sensor output vectors. Noniterative orientation determination increases the speed with which orientation is determined over the speed obtainable with iterative orientation determination. Noniterative orientation determination is also advantageous over iterative orientation determination in that it is free from latch up and has reduced software complexity.

Sensor Response

The orientation rotations that convert the output of an equivalent zero-orientation sensor into the output of the true sensor 100 can be combined into a single matrix A, which can be expanded using Table 1 to produce:

$$A = T_\psi T_\theta T_\psi =$$

$$\begin{bmatrix} \cos\theta\cos\psi & \cos\theta\sin\psi & -\sin\theta \\ -\cos\phi\sin\psi & \cos\phi\cos\psi & \\ +\sin\phi\sin\theta\cos\psi & +\sin\phi\sin\theta\sin\psi & \sin\phi\cos\theta \\ \sin\phi\sin\psi & -\sin\phi\cos\psi & \cos\phi\cos\theta \\ +\cos\phi\sin\theta\cos\psi & +\cos\phi\sin\theta\sin\psi & \end{bmatrix} \quad (27)$$

Suppose that a source excitation produces a response $f_4(X) = [1, 0, 0]^T$ in a zero-orientation sensor (i.e., the field at the sensor location has an $X_1$-axis orientation). The output from the real sensor 100 is then $f_4(X) = A f_4(X) = [a_{11}, a_{21}, a_{31}]^T$ which is the first column of $A$. Similarly, the second and third columns of A represent the sensor responses to fields of $Y_1$- and $Z_1$-axis orientations, respectively.

If the normalized sensor output vectors corresponding to fields of $X_1$-, $Y_1$-, and $Z_1$-axis orientations can by synthesized, the elements of A will be known, and the angles $\psi$, $\theta$, and $\phi$ can be determined. For example, using the sensor X-axis response to a field of $Z_1$-axis orientation:

$$\hat{\theta} = -\arcsin f_{5x}(Z) = -\arcsin a_{13} \quad (28)$$

The angles $\hat{\psi}$ and $\hat{\phi}$ can now be determined by using the just-determined value of $\hat{\theta}$ to cancel the $\sin\theta$ and $\cos\theta$ factors in the responses corresponding to $a_{11}$, $a_{12}$, $a_{23}$, and $a_{33}$.

Errors in the range estimate and variation in the source magnetic moment produce a multiplicative error common to all sensor output vectors. The effects of those errors can be avoided by determining orientation from ratios of sensor responses:

$$\hat{\psi} = \arctan\left[\frac{f_{5x}(Y)}{f_{5x}(X)}\right] = \arctan\left[\frac{a_{12}}{a_{11}}\right] \text{ and} \quad (29)$$

$$\hat{\phi} = \arctan\left[\frac{f_{5x}(Z)}{f_{5x}(Z)}\right] = \arctan\left[\frac{a_{23}}{a_{33}}\right] \quad (30)$$

(Note that a four-quadrant inverse tangent will place $\hat{\psi}$ and $\hat{\phi}$ in the proper quadrant.) Elevation $\hat{\theta}$ can be determined from:

$$\hat{\theta} = \arctan\left[\frac{f_{5x}(Z)}{f_{5x}(X)/\cos\psi}\right] = \arctan\left[\frac{a_{13}}{a_{11}/\cos\psi}\right] \quad (31)$$

or three similar ratios using $a_{13}$, $a_{12}$, $a_{23}$, or $a_{33}$. A linear combination of all four ratios can also be used to minimize the effects of noise.

While orientation is most simply determined using elements from all three synthetic sensor output vectors, inspection of the matrix A in equation (27) shows that the information contained in any two columns is sufficient to determine all three orientation angles. Some flexibility is therefore possible in a noisy environment; e.g., orientation can be estimated from the two output vectors with minimum estimated noise. Alternatively, information from all three output vectors might be combined by linearizing the elements of A about the initial orientation estimates from equations (29), (30), and (31). Minimum-variance linear combinations would then be formed to improve the initial estimates.

Three State Excitation

Fields of $X_1$-, $Y_1$-, and $Z_1$-axis orientation are produced at the sensor location only when the sensor 100 is located on the $X_1$, $Y_1$, or $Z_1$ axis. The source excitation pattern is fixed to allow multiple sensors to derive position and orientation information from the same signals. The responses of the sensor fields of $X_1$-, $Y_1$-, and $Z_1$-axis orientations are therefore synthesized from the real sensor responses, which span three-dimensional vector space.

The three true sensor output vectors can be assembled into a $3 \times 3$ matrix $F_5$, which can then be written as:

$$[f_5(S1) : f_5(S2) : f_5(S3)] = F_5 = \frac{C}{\rho^3} A Q I = \quad (32)$$

$$\frac{C}{\rho^3} A Q [f_1(S1) : f_1(S2) : f_1(S3)]$$

From the above equation, it is evident that the desired matrix $A$ of synthetic responses can be obtained as $$\hat{A} = \frac{\hat{\rho}^3}{C} F_5 \hat{Q}^{-1} \quad (33)$$

The coupling matrix $\hat{Q}^{-1}$ is computed using estimated values $\hat{\alpha}$ and $\hat{\beta}$. Note that actual matrix inversion is unnecessary, since:

$$Q^{-1} = (T - \alpha T - \beta S T \beta T \alpha)^{-1} = T - \alpha T - \beta S T \beta T \alpha, \quad (34)$$

where:

$$S^{-1} = \begin{bmatrix} 1 & 0 & 0 \\ 0 & -2 & 0 \\ 0 & 0 & -2 \end{bmatrix} \quad (35)$$

Two State Excitation

While all orientation information is contained in any two sensor output vectors, synthesis of the desired sensor responses (i.e., the matrix A) requires a three-dimensional set of basis vectors. The cross product of two sensor output vectors provides the necessary third vector. Since orthogonal rotations preserve the angles between vectors:

$$f_5(CP) = f_5(S1) \times f_5(S2) = \quad (36)$$

$$[A f_4(S1)] \times [A f_4(S2)] = A [f_4(S1) \times f_4(S2)]$$

The cross products can be used in place of the vectors produced by the third excitation state in forming the matrices $F_5$ and $F_4$, thus:

$$F_5 = [f_5(S1) : f_5(S2) : f_5(CP)] = \quad (37)$$
$$A [f_4(S1) : f_4(S2) : f_4(CP)] = A F_4$$

The vectors $f_4(S1)$ and $f_4(S2)$, hence $f_4(CP)$ can be calculated from the estimated position. The vector $f_5(CP)$ can be calculated from the two sensor output vectors. The estimated orientation matrix $\hat{A}$ can then be determined from:

$$A = F_5 F_4^{-1} \quad (38)$$

orientation angles are then determined as discussed previously. For computational convenience, it may be desirable to multiply $f_5(S1)$, $f_5(S2)$, $f_4(S1)$, and $f_4(S2)$ by $\hat{\rho}^3/C$ before computing the cross products; this results in the cross-product vectors and sensor output vectors of roughly the same magnitude.

Matrix inversion can be avoided by an alternative method of determining orientation. Linear combinations of the two field vectors at the sensor location form two orthogonal synthetic field vectors; application of the same coefficients to the two sensor output vectors produces the analogous synthetic response vectors.

The two synthetic sensor response vectors are placed in the second and third columns of a matrix $\underline{A}'$, and orientation angles $\psi'$, $\theta'$, and $\phi'$ are determined from those two columns. Those orientation angles are defined in the same manner as are $\psi$, $\theta$, and $\phi$, but are referenced to the $Y'$-$Z'$ coordinate frame formed by the two synthetic field vectors. The orientation $(\alpha', \beta', \gamma')$ of the $Y'$-$Z'$ axes with respect to the $X_1$-$Y_1$-$Z_1$ axes is then determined by multiplying direction cosine vectors. The matrix A whose orientation angles are referenced to the $X_1$-$Y_1$-$Z_1$ coordinate frame is then $$\underline{A} = \underline{T}_{\phi'} \underline{T}_{\theta'} \underline{T}_{\psi'} \underline{T}_{\gamma'} \underline{T}_{\beta'} \underline{T}_{\alpha'} \quad (39)$$

This method may allow a reduction of computation time in some applications.

Figure 16:
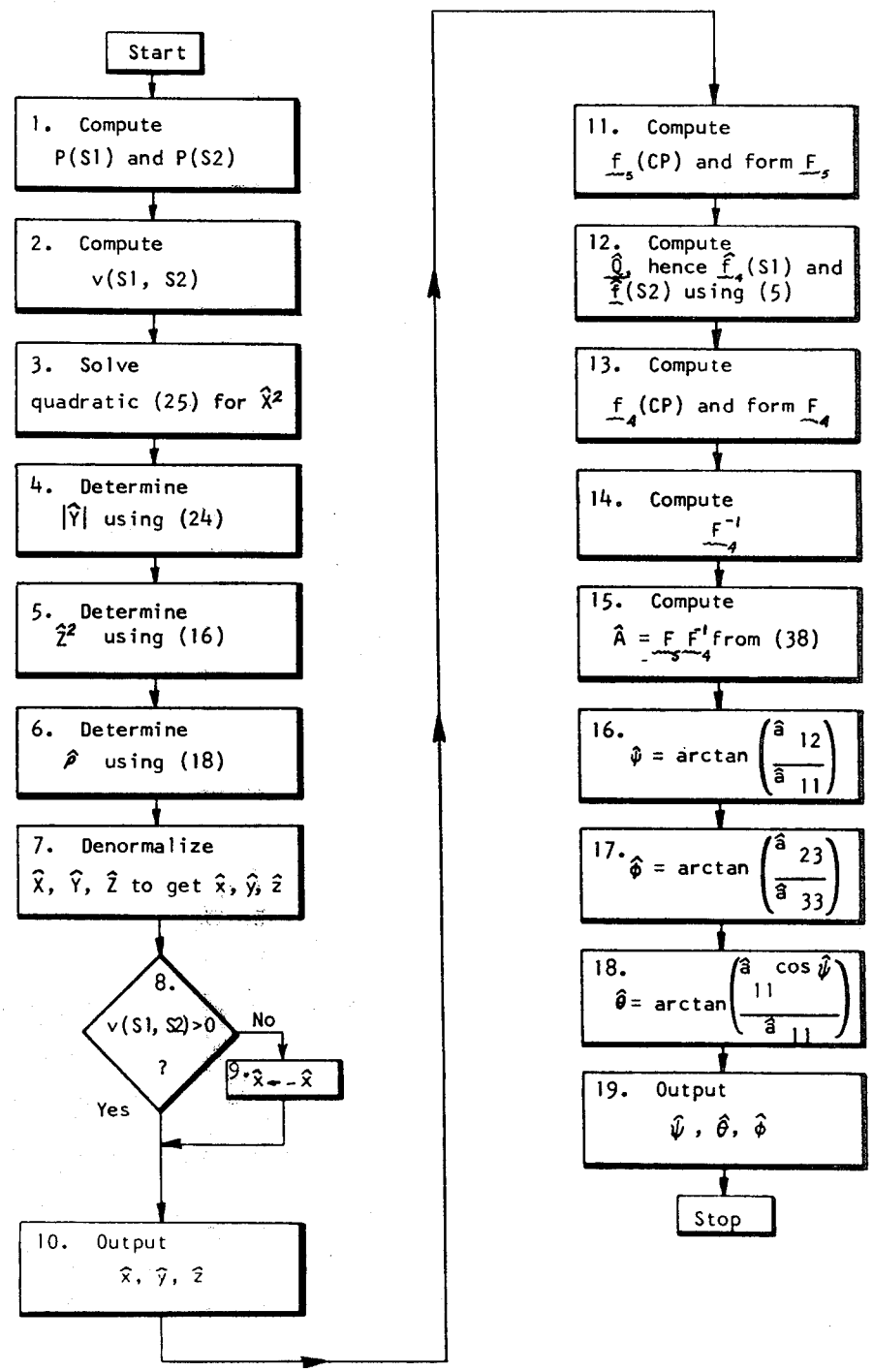
FIG. 16 is a flow diagram of the computations performed at the receiver of the present invention by which position and orientation estimates are derived.

A summary of the above discussed computational process by which position and orientation estimates are derived from the received electromagnetic field components is presented in flow-chart form in FIG. 16. Two-state source excitation of a two-axis source and three-axis sensing are assumed, and the two quadrant ambiguity is resolved by restricting y and z to values greater than zero. If three-state excitation of a three-axis source and two-axis sensing are utilized, the flow-chart is identical with three exceptions: (a) block 10 is eliminated, (b) a coordinate conversion block is inserted immediately after block 18, and (c) all six measurements are output in block 19.

SIGNAL FORMAT AND MULTIPLEXING

The signal format used by the transmitter must be designed to allow the user to determine his position and orientation. The geometric computations discussed in the previous section establish some informational parameters which are advantageously met by the format. First, it must allow airborne components 20 to determine the amplitude of the signal induced in a given receiving antenna (22, 23 or 24) by each transmitting antenna (41 or 42). Secondly, it advantageously provides one-way data transmission capability so airborne components 20 will know the magnetic moment, (i.e. strengths), of the transmitted signal. Thirdly, to facilitate communication of both of the previous information parameters, the signal includes a timing reference, and all signal components should advantageously be coherent with this reference. The timing signal is used to characterize the polarity of the transmitted signal. If this timing signal is omitted, there is an increase in the ambiguity as to position and orientation of the remote object. Of course, independent information sources may be used to remove this ambiguity. For example, navigation aids may be used to determine the quadrant (i.e. northeast, southeast, northwest or southwest) of the remote object with respect to the radiating means; altimeters may be used to determine the relative height of the remote object with respect to the radiating means, which may be located at the top of the hill.

There are endless varieties of formats which can meet the above requirements. However, it is additionally desirable that the signal format alloy easy acquisition by the user as he approaches the landing point. Simplicity in the receiver is also quite desirable. Four possibilities for transmitted signal format are: (1) Frequency Division Multiplexing, (2) Time Division Multiplexing, (3) Phase Division Multiplexing; and (4) Spread Spectrum Multiplexing. These four multiplexing techniques have been more thoroughly discussed in U.S. Pat. No. 4,054,881, the disclosure of which has been incorporated herein by reference.

While different formats may be preferred for different specialized applications, a frequency division multiplexing format will be advantageous to many general purpose users. Measurements may be made simultaneously and continuously, and carriers will be available to aid in acquisition by an approaching aircraft. Data may be impressed on the carriers by coherent frequency shift keying. The field strength varies only 6 dB with orientation of receiving loop antennas 41 and 42 thus permitting data to be applied to only one or to all three signals. Using the same data on all carriers can be used to reduce bit error rate, and using different data on the carriers in the form of an eight level code could triple the transmission rate.

The two most significant considerations in the design of a quasi-static field positioning system are (1) determination of the excitation frequency for specified maximum measurement errors, and (2) determination of a transmitter magnetic moment that ensures no more than specified maximum measurement errors due to atmospheric (or other) noise. Design guidelines and simulated performance data are subsequently presented.

Figure 6:
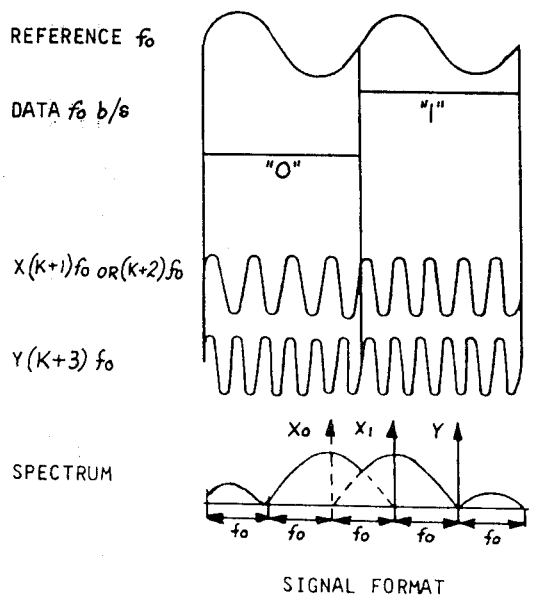
FIG. 6 is a graphical representation of the amplitude of the signals with respect to time of the electromagnetic fields and of the resultant spectrum.

The first step in establishing the system design is to decide the relationships among the mark and space frequencies and signals transmitted from the X and Y antennas. As an example, only modulation of the X signal is used so that three different frequencies are required. Since the power spectrum of random data has zeros at integral multiples of the data rate, it will be desirable to separate the Y signal from the X mark and space frequencies by the data frequency fo as shown in FIG. 6. The data modulation thus will not degrade the position/orientation performance of the system.

The next parameter which must be established is the data rate fo. The data rate itself is relatively uncritical, since the data is for the most part, fixed. The transmitting antenna typically restricts the bandwidth to one percent of the carrier frequency. Operation at 1 kHz would thus limit the data rate to about 10 bits per second (b/s). A further consideration is interference from harmonics of power system frequencies (50, 60 and 400

Hz). A data rate of 10 b/s allows all three carrier frequencies and essentially all of the modulation energy to fall between two adjacent 60 Hz harmonics.

The third step in the system design is the selection of the range of carrier frequencies. The generation of a far-field component can only result in inaccuracies in the position and orientation estimates, so it is desirable to use a low a frequency as possible. The use of frequencies below 10 kHz virtually eliminates the far-field interference. Operation below 1 kHz will make data transmission more difficult and subject the receiver to larger amplitude harmonics from power systems and larger atmospheric noise levels in the case of a landing aid application. The range of 1 to 10 kHz is therefore advantageous for many users.

Atomspheric noise fields in the 10-14 kHz range are typically no worse than 20 $\mu$V/m, which is roughly equivalent to a magnetic field of 0.05 $\mu$A/m (measured in a 1 Hz bandwidth). An examination of curves for the 1 to 10 kHz range shows that while atmospheric noise at 1 kHz is about the same as it is at 10 kHz, there is generally a 10 dB lower noise level in the 3 to 4 kHz range. This null is the result of the high attenuation rate of the earth-ionosphere waveguide at these frequencies. Additional range and accuracy may therefore be obtained by operating in the 3 to 4 kHz range.

Atmospheric noise in the VLF-ULF region results from lightning discharges and is therefore impulsive, rather than guassian. Much power line noise is also impulsive, since it results from periodic current surges, although these impulses are considerably wider than lightning generated impulses. The receiver can use this impulsive nature to obtain 15 to 20 dB of noise reduction by clipping the impulses to an amplitude only slightly larger than that of the signal. Editing or noise blanking can obtain even greater reduction in noise level.

Signal-to-noise ratios for four typical operating conditions are shown in Table 4:

TABLE 4

| Link Calculations | |
|---|---|
| Basic Parameters | |
| Noise at 1 or 10 kHz, B = 1 Hz | 0.05 $\mu$A/m |
| Transmitter magnetic moment | 400 A · m$^2$ |
| Magnetic field at 1 km | 0.4 $\mu$A/m |
| Base SNR, navigation (B = 1 Hz) | +18 dB |
| Base SNR, data (B = 20 Hz) | +5 dB |
| Basic Effects | |
| Editing/clipping | +20 dB |
| Transmitter antenna orientations | 6 dB |
| Net effect | +14 dB |
| Example 1: $\rho$ = 1 km, f = 1 or 10 kHz | |
| Basic SNR + basic effects | |
| SNR, data | +19 dB |
| SNR, navigation | +32 dB |
| Example 2: $\rho$ = 2 km, f = 3 to 4 kHz | |
| Distance increase for example 1 | −18 dB |
| Noise null | +10 dB |
| SNR, data | +11 dB |
| SNR, navigation | +24 dB |
| Example 3: $\rho$ = 3.17 km, f = 3 to 4 kHz | |
| Distance increase from example 2 | −12 dB |
| SNR, data | −1 dB |
| Penalty for not decoding data | −3 dB |
| SNR, navigation, B = 1 Hz | +9 dB |
| 10 Second integration | +10 dB |
| SNR, navigation B = 0.1 Hz | +19 dB |
| Example 4: $\rho$ = 4 km, f = 3 to 4 kHz | |
| Distance increase from example 3 | 6 dB |
| SNR, data | 7 dB |

TABLE 4-continued

| Link Calculations | |
|---|---|
| SNR, navigation | 13 dB |

A transmitter moment of 400 A·m$^2$ produces a field of 0.4 $\mu$A/m at a distance of 1 km. Since navigation (position and orientation) estimates can be based on a one second averaging of measurements, their effective bandwidth is 1 Hz, and their basic signal-to-noise ratio is +18 dB. Data decoding necessitates a bandwidth of about 20 Hz, hence a 13 dB penalty relative to navigation estimates, and thus a +5 dB basic signal-to-noise ratio.

However, two effects must also be considered. First, about 20 dB of noise reduction can be obtained by clipping or editing of impulsive noise. Secondly, the field strength attributable to a given transmitting antenna varies with the receiver orientation relative to that antenna, and can thus introduce up to a 6 dB reduction in signal amplitude. There is no loss due to receiver orientation, since the outputs from all three receiving antennas (22, 23 and 24) are mathematically combined to derive the total signal vectors. The results of these two effects are signal-to-noise ratios at a 1 km distance of +32 dB for navigation and +19 dB for data. These correspond to a 1° rms angular error and a negligible bit-error rate.

The second example in Table 4 is for operation in the 3 to 4 kHz frequency range at a distance of 2 km. While doubling the distance decreases the signal strength by 18 dB, operating in the atmospheric noise null and band results in a 10 dB decrease in the noise power. Consequently, the navigation and data signal-to-noise ratios are +24 and +11 dB, respectively. There are equivalent to 2.6° rms angular errors and a 10$^{-4}$ bit-error rate.

In the third example in Table 4, the range is increased to 3.17 km, resulting in a 12 dB decrease in signal amplitude from its level at 2 km. As a result, the data signal-to-noise ratio drops to −1 dB making the data essentially undecodable. Since the X signal cannot be identified as either a mark or space frequency, the measurements on the two frequencies must be averaged, resulting in a 3 dB increase in received noise power. The resultant +9 dB navigation SNR is equivalent to 14° rms error. However, at this distance changes in the relative orientation should occur relatively slowly, allowing the integration time to be increased to 10 seconds. This 10 dB increase in SNR reduces the rms measurement error to 4.5°.

The last example in Table 4 describes performance at the design range of 4 km. Signal strength decreases by 7 dB from that of the third example, resulting in a 13 dB signal-to-noise ratio for navigation, or a 90° rms error. This example typifies initial acquisition of the landing aid signals by an approaching aircraft.

One landing aid system can cover an entire airfield. However, it is possible to use a single high-power system in the vicinity of a set of landing pads, and separate low-power systems in each landing pad. This would provide both long range capability and very precise zero-visibility pinpoint landing capabilities. As already mentioned, the use of low-frequency near-fields will reduce jamming and interference problems. In the example design described above, increasing the distance to 8 km would reduce the signal strength to 5 dB, requiring about 100 seconds of integration to detect the presence of a signal. Radiation of significant far-field jamming signals requires a high-power transmitter and a relatively large antenna. In addition, operation in the 3 to 4 kHz range makes far-field signals subject to high attenuation rates. A near-field signal produced by similar equipment must be located at a similar range to be of similar amplitude to the landing-aid signal. Suppose, for example, that two landing aids were operating on the same frequency, and produced equal fields at the midpoint between them. As the receiver moved to half the distance from the desired landing aid, its signal would increase by 18 dB, while that of the interfering landing aid would decrease by 11 dB. The resulting 29 dB relative change would reduce interference to a negligible level. The use of a low-frequency system also provides continuous coverage at all elevations and in all directions, making it more useful to VTOL operations. The system also provides coverage of the surface and may be used for taxiway guidance. The difference in the permeability and dielectric constants of the ground and the air will cause a distortion of the shape of the magnetic field. In most cases, inclusion of simple modifying terms based on conductivity and slope of the ground should provide adequate compensation.

It should also be noted that a landing-air system can be useful in two dimensional maneuvering such as taxiing on an airport runway. Indeed, if all maneuvering is to be done in two dimensions and the only orientation component of interest is heading, such as would be the case in docking a ship, then only two orthogonal radiating means and two orthogonal receiving means need be used. Additionally, in either the two-dimensional or the three-dimensional case, independent outside inputs to the system can be used to remove ambiguity. For example, the use of an independent navigating system can be used to determine the quadrant in which the vehicle is approaching the radiating means.

SENSITIVITY

The sensitivity of the position and orientation estimates to errors in the measurements can be determined from a system of partial derivatives. While the results of such an analysis are suitable for numerical evaluation and graphing, they are in general somewhat tedious. The subsequent discussion derives some simple limits on estimation errors for three-state excitation; limits applicable to two-state excitation can be inferred by comparisons of the simulations in the next section. These limits may be used for preliminary design calculations and illustrate the behavior of the errors as functions of position and orientation of the sensor 100.

Position Errors

Consider the total absolute position coordinate error:

$$\epsilon = |\Delta x| + |\Delta y| + |\Delta z| \tag{40}$$

where each estimated coordinate has the form:

$$x = x + \Delta x = \sqrt{x^2 + \Delta(x^2)} \simeq \begin{cases} x + \frac{1}{2x}\Delta(x^2), & x \neq 0 \\ \sqrt{\Delta(x^2)}, & x = 0 \end{cases} \tag{41}$$

Use of the Schwartz inequality and the normalization $\hat{X}^2 = \rho^8 \hat{X}^2 / C^2$ produces:

$$|\Delta(x^2)| \leq \frac{\rho^8}{C^2} |\Delta(X^2)| + \frac{X^2}{C^2} |\Delta(\rho^8)| \tag{42}$$

Manipulation of equation (18) then produces:

$$\Delta(\rho^8) = -\frac{8\rho^2}{9} \frac{C^2}{P(T)} \frac{\Delta P(T)}{P(T)} \tag{43}$$

where $P(T) = P(S1) + P(S2) + P(S3)$ and $\Delta P(T) = \Delta P(S1) + \Delta P(S2) + \Delta P(S3)$.

A simple form for $\epsilon$ can be obtained when $|x| = |y| = |z| = \rho/\sqrt{3}$. The errors $\Delta X^2$, $\Delta Y^2$, and $\Delta Z^2$ are related to the measurement errors $\Delta P(S1)$, $\Delta P(S2)$, and $\Delta P(S3)$ by equation (17), and equation (18) is used to simplify the sum $X + Y + Z$. The Schwartz inequality is again used to obtain the worst-case limit:

$$\epsilon_{max} = \frac{32\sqrt{3}}{27} \frac{\Delta P(T)}{P(T)} \rho \simeq 2.053 \frac{\Delta P(T)}{P(T)} \rho \tag{44}$$

The factor $1/x$ in equation (41) and the analogous forms for $y + \Delta y$ and $z + \Delta z$ cause the error sensitivity to increase as the position coordinates differ from $|x| = |y| = |z| = \rho/\sqrt{3}$. It is also evident that position error can be greatly increased when the sensor 100 is located on a coordinate axis; for example, $\sqrt{1.01} \simeq 1.005$ while $\sqrt{0.01} = 0.1$, indicating error multiplication by a factor of 50. When the initial position estimate indicates that an unsatisfactory degradation of accuracy is possible, the following procedure should be used: (1) Determine a sequence of two rotations of the source that would produce sensor coordinates of roughly $|x'| = |y'| = |z'| = \rho/\sqrt{3}$. (2) Apply those rotations to the three sensor output vectors to determine the output vectors that would be produced by the rotated source 102. (3) Compute the estimated position $(\hat{x}', \hat{y}', \hat{z}')$ in the rotated coordinate frame. (4) Apply inverse rotations to the position estimate to return it to the true source coordinate frame. Position errors comparable to those given by (44) will then be obtained. Alternatively, a linearized position and orientation estimator may be applied in the vicinity of the initial position and orientation estimates.

Orientation Errors

Orientation angles are estimated through inverse tangents of the ratios of two elements of the estimated orientation matrix $\hat{A}$. Errors in the estimated angles can therefore readily be related to errors in estimating the elements of $\hat{A}$. For example, a small-angle expansion of equation (29) produces:

$$\Delta\psi = \frac{\cos\psi}{\cos\theta} \Delta a_{12} - \frac{\sin\psi}{\cos\theta} \Delta a_{11} \tag{45}$$

The unbounded increase in the errors for $\theta \simeq \pm 90°$ can be avoided by recomputing the estimated angles using inverse cotangents of the inverse ratios whenever the estimated elevation produces $|\cos\theta| < \frac{1}{2}$; the "damage" done by division by $\cos\theta$ in equation (45) is therefore limited to a factor of 2. If $\Delta a$ represents the maximum error occurring in an individual element of $\hat{A}$, the Schwartz inequality applied to equation (45) produces:

$$|\Delta\psi| \leq 2\sqrt{2} |\Delta a| \simeq 2.828 |\Delta a| \tag{46}$$

The errors in the elements of $\hat{\underline{A}}$ arise from two sources. Errors caused by atmospheric noise or scattering by the conducting ground in the field measurements ($\underline{F}_4$) are converted directly into errors $\Delta a_{ij}$ by the transformation given in equation (34). Since the orthogonal rotations do not alter the magnitudes of the errors, the worst case effect is multiplication by a factor of 2 caused by elements of $\underline{S}^{-1}$. Errors in the estimated position azimuth and elevation ($\hat{\alpha}$ and $\hat{\beta}$) produce imperfect cancellation of the effects of position (i.e., $\underline{Q} \hat{\underline{Q}}^{-1} \neq \underline{I}$). The contribution to an error $\Delta a$ caused by these errors cannot exceed $2|\Delta a|$ or $2|\Delta \beta|$.

OPERATION

Underground Position and Orientation Determining System

The analysis used in the system design of a remotely controlled underground drill system 106 is somewhat different from that used in the landing aid system design because transmission in the drill system 106 is through the earth rather than through air, as in the landing air system. Estimates of sensor position and orientation obtained from the position and orientation finding algorithms were based on free-space geometry. Variations in the field geometry caused by the conducting ground therefore cause errors in the estimated parameters. The magnitude of the effects of ground of a known maximum conductivity can be estimated through simple image theory as discussed below. Accurate prediction of the actual fields requires the use of more sophisticated techniques.

Figures 12, 13:
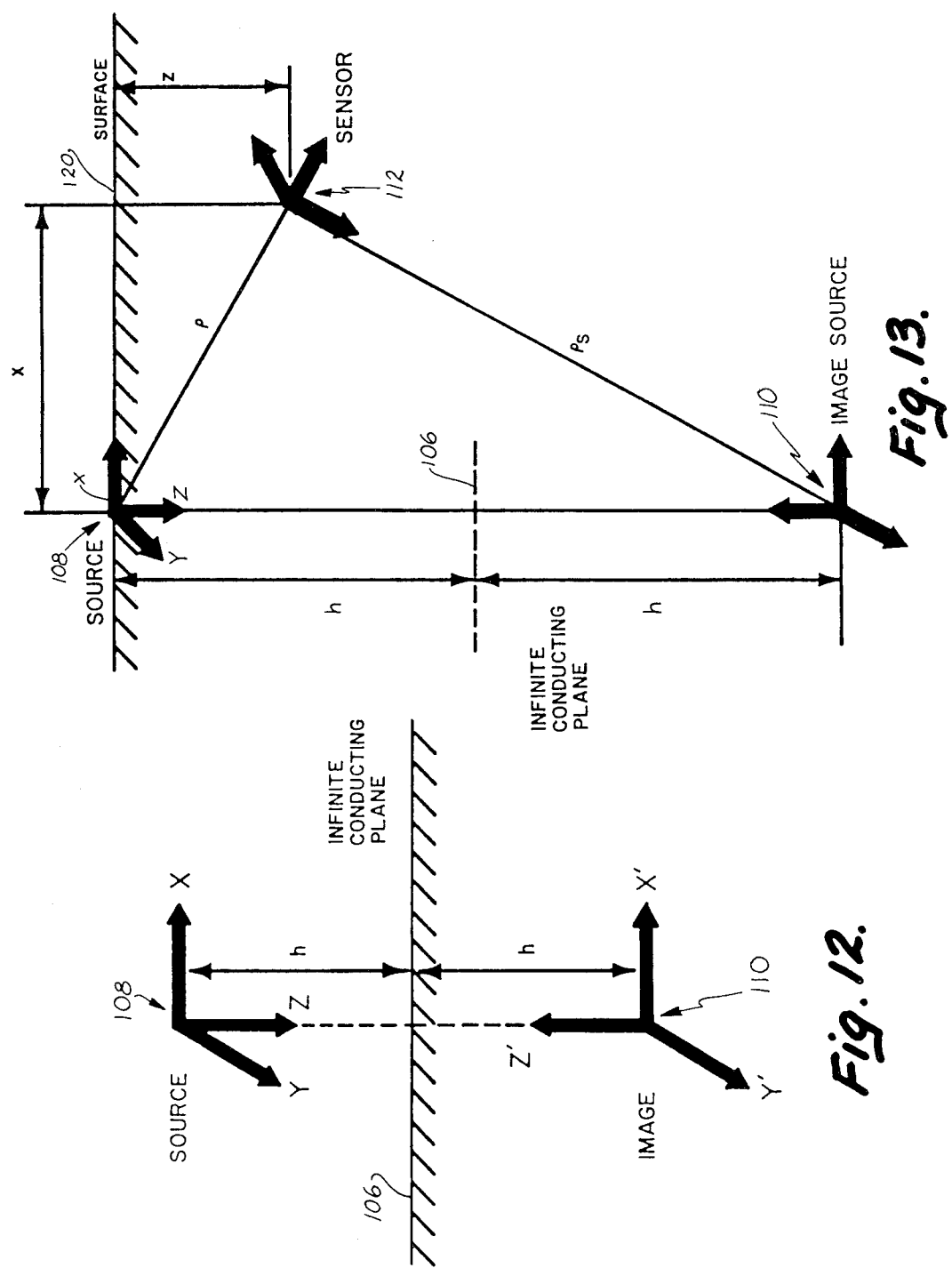
FIG. 12 is a graphical representation of the basis of simple image theory.
FIG. 13 is a graphical representation of the application of simple image theory to a subsurface positioning problem such as the remotely controlled underground drill system.

The basis of simple image theory is illustrated in FIG. 12. A perfectly conducting, flat plane 106 of infinite extent located at a distance h from the source is replaced by an image (secondary) source located at a distance 2h from the true (primary) source. The orientation of the image of a horizontal magnetic dipole (i.e., a dipole whose orientation is parallel to the surface of the conducting plane) is the same as that of the true dipole source 108. However, the orientation of the image of a vertical magnetic dipole (i.e., a dipole whose orientation vector is perpendicular to the conducting plane) is opposite to that of the true dipole source 108. The fields at the sensor location are the sum of the primary fields (from the true source 108) and the secondary fields (from the image source 110). Application of this model shows that when a three-axis source 108 is located on the surface of a conducting plane with its Z axis perpendicular to the plane, the fields due to the X and Y dipoles are doubled, while the fields from the Z dipole are cancelled. This implies that the two-state algorithm should be used whenever the source must be located in close proximity to a conducting plane. An important advantage of the present invention is its ability to operate without compensation for field distortion, or scattering, when a two-axis source or a two-axis sensor is installed on a flat conducting plane.

Referring to FIG. 13, simple image theory is applied to the subsurface positioning problem by replacing the ground of conductivity $\sigma$ with a perfectly conducting plane 106 located a distance h below the surface 120. The physical depth of this plane is the electrical skin depth:

$$h = \sqrt{\frac{2}{\omega \mu_0 \sigma}} \quad (47)$$

where $\mu_0 \approx 4\pi \times 10^{-7}$ is the permeability of free space. The conducting plane 106 is in turn replaced by an image located at a depth 2h, resulting in the geometrical relationships depicted in FIG. 13.

The relative amplitudes of the primary and secondary fields are then proportional to $1/\rho^3$ and $1/\rho_S^3$, respectively, where $\rho$ is the distance from the source 108 to the sensor 112 and $\rho_S$ is the distance from the image source 110 to the sensor 112. It is evident from FIG. 13 that for a given distance $\rho$, the greatest effect of the ground occurs when the sensor 112 is located directly below the source 108. If the worst-case condition of alignment of the primary and secondary field vectors is assumed, then:

$$\frac{\Delta P}{P} = \frac{2f \Delta f}{f^2} = 2 \frac{\Delta f}{f} = 2 \frac{\rho^3}{\rho_S^3} \quad (48)$$

where f represents a field amplitude measurement.

Equation (48) can now be used to constrain position and orientation errors; for example, combination with (44) yields the design requirement:

$$\frac{\rho}{\rho_S} \leq 0.624 \sqrt[3]{\frac{\epsilon_{max}}{\rho}} \quad (49)$$

If one requires that $\epsilon_{max}/\rho \leq 0.01$, then $\rho/\rho_S \leq 0.135$. If the sensor 112 is located directly below the source 108, $\rho_S = 2h - \rho$, hence $h = 4.22\rho$. Operation at a depth of 300 meters then requires $h \geq 1.265$ km; if $\sigma = 0.01$ mho/m, the maximum usable frequency is 15.8 Hz.

Figure 14:
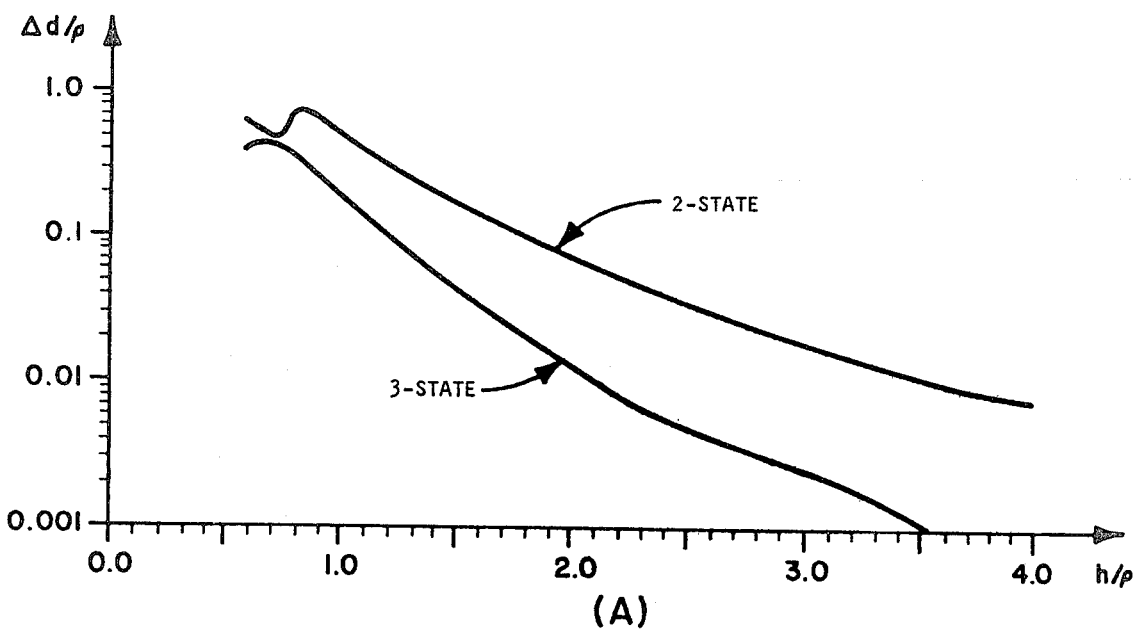
FIGS. 14A and 14B are a graphical representation of simulated performance of the present invention in the presence of a conducting plane.
Figure 14:
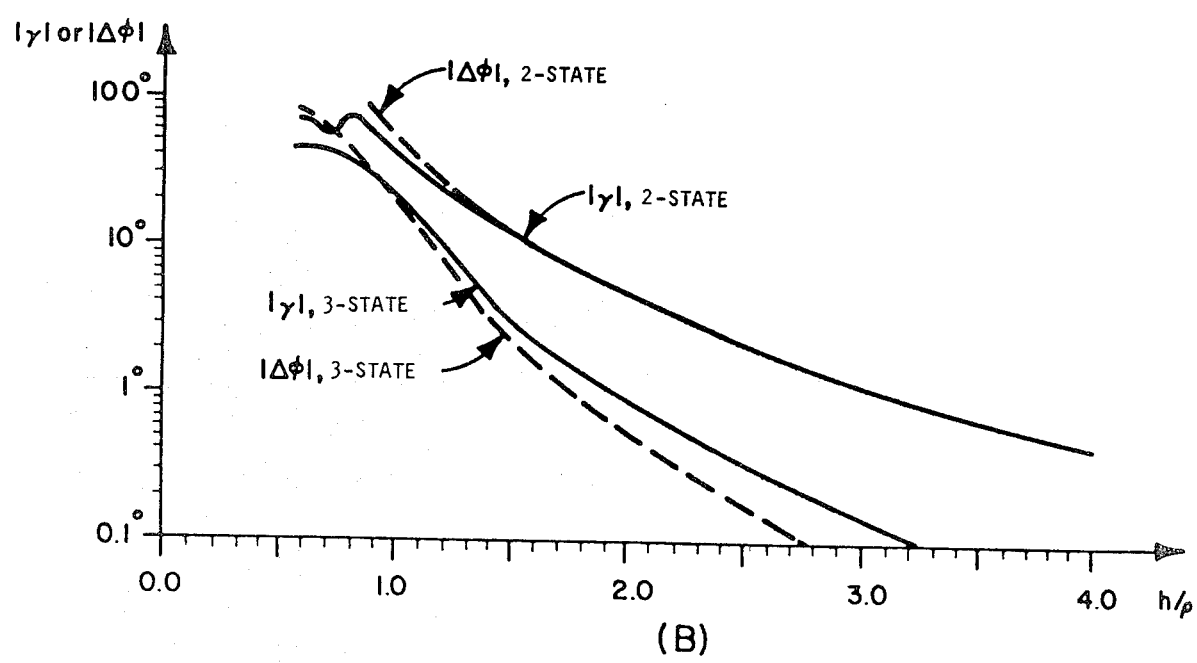

Simulated performance in the presence of a conducting plane is shown in FIG. 14. The parameters graphed are position error $\Delta d = [(\Delta x)^2 + (\Delta y)^2 + (\Delta z)^2]$ and orientation line-of-sight error $|\gamma|$ and roll error $|\Delta \phi|$. On the basis of these simulations, it appears that two-state operation requires a skin depth approximately 1.5 times that required for three-state operation with the same errors. Equivalently, a transmission frequency lower than that for three-state operation by a factor of 0.816 is required.

Once an operating frequency has been selected, the expected electrical noise level can be determined from published data. That noise level can then be converted into a required carrier-to-noise ratio and subsequently into a required transmitter magnetic moment for a given position or orientation accuracy. Note that since the effects of the conducting ground are assumed to be relatively small, the expected value of the subsurface atmospheric noise is essentially the same as that on the surface.

The sum of the errors in the squared vector magnitudes is approximately:

$$\Delta P(T) = 2|\underline{f}_5(S1)| \Delta|\underline{f}_5(S1)| + \quad (50)$$
$$2|\underline{f}_5(S2)| \Delta|\underline{f}_5(S2)| + 2|\underline{f}_5(S3)| \Delta|\underline{f}_5(S3)|$$

If the noise errors are small in comparison to the signal amplitudes, the effects of noise vectors that are orthogonal to the signal vectors are negligible. If all three significant noise errors have the same expected rms value $\sigma_n$, the expected squared error in the sum of the squared vector magnitudes is:

$$E[\{\Delta P(T)\}^2] = 4[|f_{\sim 5}(S1)|^2 + |f_{\sim 5}(S2)|^2 + \quad (51)$$
$$|f_{\sim 5}(S3)|^2]\sigma_n^2 = 4 P(T)\sigma_n^2$$

Figure 15:
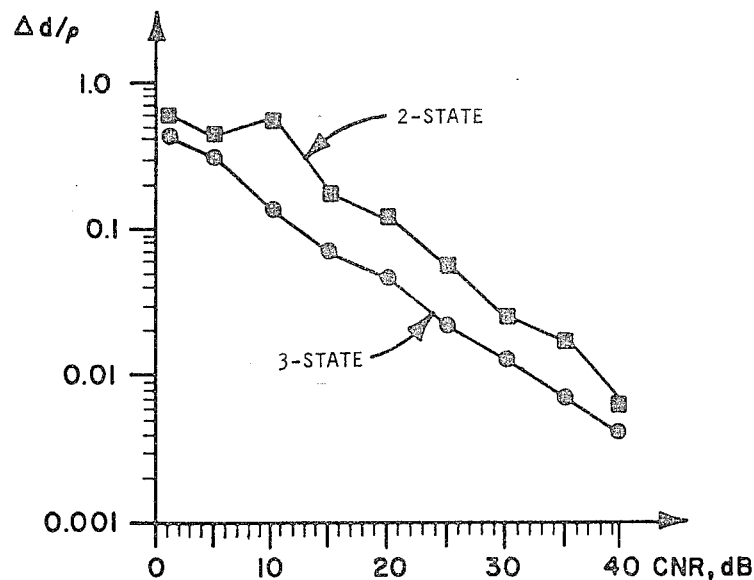
FIGS. 15A and 15B are a graphical representation of simulated performance of the present invention in the presence of gaussian noise.
Figure 15:
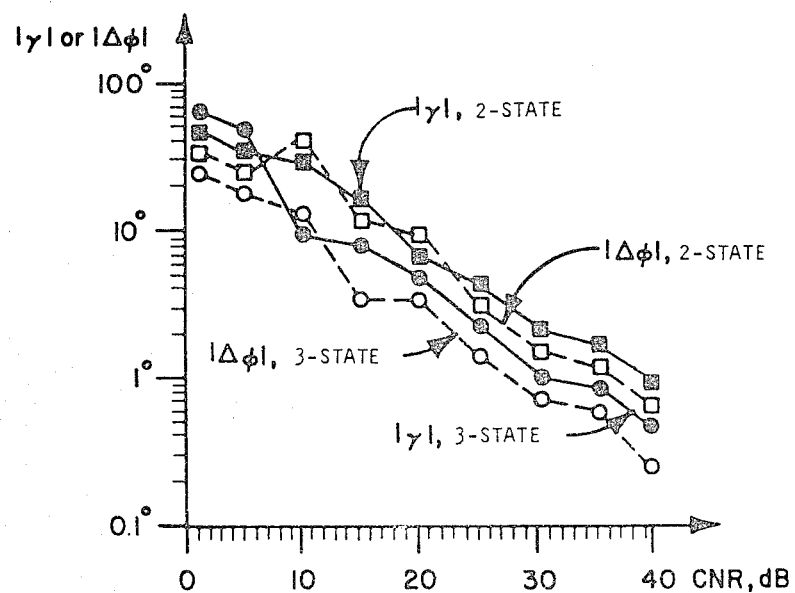

While the above expression can be used to constrain the position of orientation errors or to determine a required P(T), it does not yield a simple relationship when combined with equations (44) or (46). It is therefore more convenient to use the simulated performance data presented in FIG. 15. Each point represents the rms average of errors in 10 estimates.

Since the signal and noise amplitudes vary from state to state and axis to axis, the carrier-to-noise ratio (CNR) is arbitrarily defined as total (two or three states) signal power divided by total (two or three states) noise power. If the rms noise is expected to be the same for all axes and all excitation states, this produces:

$$CNR = \frac{(\frac{1}{3})P(T)}{9\sigma_n^2} = \frac{C^2}{27 \rho^6 \sigma_n^2} \quad (52)$$

Note that although the third state is not actually excited, equation (52) is used without modification for two-state operation.

To illustrate the use of the above relationships, suppose that an rms position error of $0.01\rho$ is required at a distance of 300 meters through ground of conductivity $\sigma = 0.01$ mho/m. For three-state operation, FIG. 15 specifies CNR $\geq 32$ db = 1584. Electric-field rms atmospheric noise measured in a 1 Hz band width is expected to be in the range of $-72$ dB relative to 1 V/m. A 20 dB effective noise power reduction can be obtained by integrating each signal for 100 seconds. This produces an effective noise level of $-92$ dB relative to 1 V/m or 25.1 $\mu$V rms, which is equivalent to a magnetic-field noise of 0.067 $\mu$A/m rms. Substitution of $\sigma^n$, $\rho^6$, and CNR into equation (52) yields C=372, hence M=NIA=$2\pi$C=2338. This can be produced by square loops of N=10 turns with 5 meter sides driven by $I_{rms}=9.35$ Arms. If #10 aluminum wire is used, each loop weighs 4.52 kg and requires 54.7 W of driving power.

Individual sensor outputs should be integrated to minimize the effects of noise; squared vector magnitudes and dot products should be computed only after signal integration is completed. Estimates of squared vector magnitudes are biased slightly larger than their true values, since the expected contribution of noise to the square of a noisy signal is always positive; i.e., $E[(f+n)^2]=E[f^2]+E[n^2]$. When the expected noise power is known a priori or is estimated by another receiver, it may be possible to improve the estimates of squared vector magnitudes by subtracting the estimated noise-power contributions. However, if the noise-power contributions are estimated by averaging the squares of the received signals, the errors in the noise-power estimates are comparable to the noise power and therefore are of little use. Since low-frequency atmospheric noise has an impulsive character, typical improvements of 10 to 15 dB can be obtained by clipping or editing the signals.

COMPENSATION FOR THE EFFECTS OF FIXED-POSITION SCATTERERS

Many applications of the present invention operate in an environment containing metallic objects that are fixed in position with respect to the source. Such scatterers produce a distorted or scattered electromagnetic field that is fixed in its characteristics as a function of position. Several approaches can be taken for compensating for this type of scattering. For the purpose of simplification, entire position and orientation algorithms are hereinafter denoted by the notations P* and O*, respectively. Other notation is the same as that previously used.

Compensation With Sensor of Zero Orientation

Referring to the flow chart of FIG. 17, consider first a simplified compensation problem in which the sensor orientation is fixed at $\psi=\theta=\phi=0$, hence $\underline{A}=\underline{I}$. If all three source axes are sequentially excited, the three sensor output vectors can be assembled into $3 \times 3$ source-to-sensor coupling matrix Q''(x, y, z) for the particular sensor position (x, y, z):

$$Q''(x,y,z) = \frac{1}{C} \underline{F}_{\sim 5} = \quad (53)$$
$$\frac{1}{C} \underline{F}_{\sim 5} = \frac{1}{C} [f_{\sim 5}(S1) \vdots f_{\sim 5}(S2) \vdots f_{\sim 5}(S3)]$$

The constant C includes the factor $\frac{1}{2}$, the source magnetic moment, and the sensor gain and sensitivity parameters, which are assumed to be the same for all axes. In free space, the coupling matrix Q'' has the form:

$$\underline{Q}'' = \underline{Q}' = \frac{1}{\rho^3} \underline{Q} = \frac{1}{\rho^5} \begin{bmatrix} x^2 - \frac{1}{2}y^2 - \frac{1}{2}z^2 & \frac{3}{2}xy & \frac{3}{2}xz \\ \frac{3}{2}xy & -\frac{1}{2}x^2 + y^2 - \frac{1}{2}z^2 & \frac{3}{2}yz \\ \frac{3}{2}xz & \frac{3}{2}yz & -\frac{1}{2}x^2 - \frac{1}{2}y^2 + z^2 \end{bmatrix} \quad (54)$$

Suppose that after measurement of the coupling parameters has been completed, the free-space position-finding algorithm P* is applied (FIG. 17):

$$\begin{bmatrix} x' \\ y' \\ z' \end{bmatrix} = P^*[\underline{Q}''] \quad (55)$$

Unless the source and sensor are in a free-space environment the estimated position (x', y', z') is not the true position (x, y, z). In general, there is a unique one-to-one correspondence between the incorrect position and the correct position. This uniqueness makes possible several forms of compensation in a scattering environment.

One approach to compensation for this example measures the difference between the free-space coupling parameters and those in the actual environment throughout the range of movement of the sensor. The coupling-error matrix $\underline{E}$ can be represented as a function of the incorrect position (x', y', z'), thus $$\underline{E}(x', y', z') = \underline{Q}''(x, y, z) - \underline{Q}'(x, y, z) \tag{56}$$

The values of $\underline{E}(x', y', z')$ are stored in tabular or functional (polynomial) form and can thereby be found from the incorrect position estimate. The estimated coupling error $\hat{\underline{E}}$ is then subtracted from the measured coupling matrix $\hat{\underline{Q}}''$, producing an estimate $\hat{\underline{Q}}'$ of the free-space coupling matrix $\hat{\underline{Q}}'$:

$$\hat{\underline{Q}}' = \hat{\underline{Q}}'' - \hat{\underline{E}}(x', y', z') \tag{57}$$

The position-finding algorithm is then applied to this matrix, yielding an estimate $(\hat{x}, \hat{y}, \hat{z})$ of the true position:

$$\begin{bmatrix} x \\ y \\ z \end{bmatrix} = P^*(\underline{Q}') \tag{58}$$

This estimate is accurate within the limitations of the noise, measured field-coupling errors, and resolutions of the table or polynomial.

DIRECT ALGORITHMS

The previously described field compensation techniques compensate for the scattering by modifying or correcting the measured field-coupling parameters. Since the compensation parameters are functions of position, which is in turn a function of the corrected coupling, algorithms containing compensation are iterative in nature, even when they contain closed-form computations.

Direct algorithms analogous to the free-space closed-form algorithms can be derived by fitting equations to measured data. Such algorithms first determine position and then determine orientation, as does the free-space algorithm. Since these algorithms convert the measurements directly into estimates, they should have neither initialization nor step-response problems or delays.

POSITION:

Referring to the flow chart of FIG. 18, position is determined from orientation-invariant parameters such as squared magnitudes and dot products of the sensor output vectors. These parameters are obtained by premultiplying the matrix of sensor output vectors by its transpose:

$$\underline{F}^T \underline{F} = C^2 [(\underline{Q}'')^T \underline{A}^T][\underline{A} \underline{Q}''] = C (\underline{Q}'')^T \underline{Q}'' = \tag{59}$$

$$\begin{bmatrix} P(S1) & v(S1,S2) & v(S1,S3) \\ v(S1,S2) & P(S2) & v(S2,S3) \\ v(S1,S3) & v(S2,S3) & P(S3) \end{bmatrix}$$

The free-space position-finding algorithm for three-state excitation uses a system of three equations that converts the three squared vector magnitudes into three normalized squared position coordinates; for example:

$$\hat{X}^2 = 5 P(S1) - P(S2) - P(S3) \tag{60}$$

It is therefore natural to suppose that normalized, squared position coordinates in a scattering environment could be obtained by addition of terms to equation (59). For example:

$$X^2 = k_1 P(S1) + k_2 P(S2) + k_3 P(S3) \tag{61}$$

$$+ k_4 P^2(S1) + k_5 P^2(S2) + k_6 P^2(S3)$$

$$+ k_7 P(S1) P(S2) + \ldots$$

Dot products might also be included; for two-state operation, the one available dot product must be included. Needless to say, the power series can have many different forms. Values of the constants $k_1, k_2, \ldots$ would be selected for a least-squares fit of the estimated position parameters to the true position parameters throughout the region of movement of the sensor.

Orientation-Inverse Coupling Method

The measured coupling parameters can be represented by an orientation rotation $\underline{A}$ premultiplying the field-coupling matrix $\underline{Q}''$. The large-angle orientation estimator O* derives the orientation angles from an estimated orientation matrix $\hat{\underline{A}}$, which can be obtained from the field-coupling measurements $\underline{F}_5$ by:

$$\hat{\underline{A}} = \frac{1 \underline{F}}{C^{-5}} (\underline{Q}'')^{-1} = \underline{A} \underline{Q}'' (\underline{Q}'')^{-1} \tag{62}$$

In a free-space application, the inverse field-coupling matrix $(\hat{\underline{Q}}'')^{-1}$ is determined by using the estimated position coordinates $(\hat{x}', \hat{y}', \hat{z}')$ in relatively simple analytical relationships. However, in most applications with scattering, the coupling can be described practically only by using a tabular or polynomial map. To avoid real-time matrix inversion in the operation of the position-finding algorithm, the measured field-coupling matrix $\underline{Q}''$ is inverted following data collection. The inverted coupling matrix $[\underline{Q}''(x, y, z)]^{-1}$ is then stored in tabular or polynomial form, rather than $\underline{Q}''$ itself. Consequently, only a matrix multiplication is required to obtain $\hat{\underline{A}}$.

The analogy to two-state operation is straight-forward. During the mapping operation, the two zero-orientation sensor output vectors are placed in the first two columns of a matrix $\underline{G}_4$ and their cross product is placed in the third column. The resultant matrix is then inverted and the inverse is stored in tabular or polynomial form as a function of position. During system operation, the cross-product of the two real sensor output vectors is computed and inserted in the third column of $\underline{G}_5$. The estimated orientation matrix $\hat{\underline{A}}$ is then obtained as in equation (62).

Orientation-Rotation Method

Referring to the flow chart of FIG. 19, if the field-coupling matrix $\underline{Q}''$ is symmetric, $(\underline{Q}'')^T = \underline{Q}''$, and:

$$(\underline{Q}'')^2 = (\underline{Q}'')^T \underline{Q} = 1/C^2 \underline{F}_5^T \underline{F}_5 \tag{63}$$

can be obtained from the sensor output vectors. In this case, the inverse field-coupling matrix $(\underline{Q}'')^{-1}$ can be obtained directly from $(\underline{Q}'')^2$ without estimating position by determining (in order) the characteristic values, characteristic vectors, and modal matrix of $(\underline{Q}'')^2$. This allows the correct orientation to be determined without knowledge of the position or use of a scattering map. Unfortunately, the maxtrix Q" is usually not symmetric.

The approach described above suggests a noniterative technique analogous to the "orientation only" technique in which the correct orientation measurements are obtained by using a sequence of three compensating rotations. As asymmetric matrix Q" can be represented as a series of three rotations applied to one side of a symmetric matrix $\underline{M}$:

$$\underline{Q}'' = \underline{T}_{\phi''}\underline{T}_{\theta''}\underline{T}_{\psi''}\underline{M} \quad (64)$$

note that $\underline{M}$ accounts for six degrees of freedom and $\phi''$, $\theta''$, and $\psi''$ account for the remaining three degrees of freedom inherent in a 3×3 asymmetric matrix. Premultiplication of the sensor output matrix by its transpose produces:

$$(\underline{Q}'')^T \underline{Q}'' = (\underline{M}^T \underline{T}_{-\psi''} \underline{T}_{-\theta''} \underline{T}_{-\phi''}) \underline{T}_{\phi''}\underline{T}_{\theta''}\underline{T}_{\psi''}\underline{M} \quad (65)$$

$$= \underline{M}^T \underline{M} = \underline{M}^2$$

(It is evident from equation (65) that $(\underline{Q}'')^T\underline{Q}''$ cannot uniquely be converted into Q" or $(\underline{Q}'')^{-1}$ unless Q" is symmetric.)

Since $\underline{M}$ is symmetric, it is possible to compute $$\underline{M}^{-1} = (\underline{M}^2)^{-\frac{1}{2}} \quad (66)$$

Post-multiplication of the sensor output matrix by $\underline{M}^{-1}$ $$1/C \, \underline{F}_5 \underline{M}^{-1} = \underline{A} \underline{T}_{100''} \underline{T}_{\theta''}\underline{T}_{\psi''} = \underline{A}' \quad (67)$$

which will give incorrect orientation angles when used in the free-space orientation-estimation algorithm. However, the rotations $\psi''$, $\theta''$, and $\phi''$ can be mapped and stored in tabular or functional form in terms of the squared vector magnitudes and dot products in equation (59) or the incorrect position coordinates produced by $P^*[(\underline{Q}'')^T\underline{Q}'']$. A compensating rotation $$\underline{T}_c = \underline{T}_{-\psi''}\underline{T}_{-\theta''}\underline{T}_{-\phi''} \quad (68)$$

is therefore formed and applied to the sensor output matrix, producing:

$$\underline{A} = 1/C \, \underline{F}_5 \underline{M}^{-1} \underline{T}_c = \underline{A}' \underline{T}_c = \underline{A} \quad (69)$$

from which correct orientation measurements can be driven within the limits of the mapped data.

The direct algorithm using the rotation method of orientation determination should require less memory than either the direct algorithm using the inverse-field-coupling map or a compensation technique using a field or field-error map. This should be especially significant which only orientation measurements are required, since only the three compensation angles $\psi''$, $\theta''$, and $\phi''$ must be stored. However, the computation of $\underline{M}^{-1}$ from $(\underline{Q}'')^T\underline{Q}$ may be somewhat more lengthly than finding $(\underline{Q}'')^{-1}$ in a table, hence there are trade-offs to be considered in selecting a method for a particular application.

Various modifications and variations will no doubt occur to those skilled in the various arts to which this invention pertains. As discussed above, the signal format may be chosen from any numerous alternatives. Additionally, the particular parameters of the transmitting and receiving apparatus will depend upon the particular application. Systems for either longer or shorter ranges can be designed by appropriate choices of parameters. These and all other variations which basically rely on the teachings through which this disclosure had advanced the art are properly considered within the scope of this invention as defined by the appended claims.

The embodiments of the invention in which an exclusive property or privilege is claimed are defined as follows:

1. Apparatus for determining the position and orientation of a remote object relative to a reference coordinate frame comprising:
   a plurality of radiating means having orthogonal components centered about the origin of said reference coordinate frame;
   transmitter means for applying to said plurality of radiating means electrical signals which generate a plurality of electromagnetic fields, said plurality of electromagnetic fields being distinguishable from one another;
   a plurality of receiving means having orthogonal components disposed on said remote object for detecting and measuring said electromagnetic fields:
   one of said plurality of radiating means and said plurality of receiving means consisting of two orthogonal components and the other consisting of three orthogonal components; and
   analyzing means associated with said receiving means for converting the components of said electromagnetic fields received by said plurality of receiving means into remote object position and orientation relative to said reference coordinate frame with at most two ambiguous combinations of orientation and position, said analyzing means operating open loop with respect to said radiating means.

2. Apparatus as recited in claim 1 wherein said analyzing means comprises means for converting said components of said electromagnetic fields received by said plurality of receiving means into remote object position and remote object orientation relative to said reference coordinate frame, in a non-iterative manner, with at most two ambiguous combinations of orientation and position.

3. Apparatus as recited in claim 2 wherein said analyzing means is physically remote from said receiving means and said analyzing means and said receiving means are coupled by electromagnetic radiation.

4. Apparatus as recited in claim 2 wherein said radiating means and said receiving means are adapted for operation within a separation distance range where said electromagnetic fields have substantially greater near-field components than far-field components and wherein said transmitter means comprises means for applying signals to said radiating means having a frequency sufficiently low to substantially reduce interference by surrounding objects to the free-space characteristics of said electromagnetic fields.

5. Apparatus as recited in claim 4 wherein each of said radiating means is a magnetic-dipole source.

6. Apparatus as recited in claim 1 wherein said transmitter means comprises means for multiplexing, said means for multiplexing being selected from a group of circuits including circuits for time, frequency, phase and spread spectrum multiplexing of said electrical signals.

7. Apparatus as recited in claim 1 wherein said one of said radiating means and said receiving means consisting of only two orthogonal components is installed on a flat conductive plane.

8. Apparatus as recited in claim 1 wherein said analyzing means comprises means for compensating for scattering of said electromagnetic fields.

9. Apparatus for determining the position and orientation of an object relative to a reference coordinate frame comprising:
- a plurality of radiating means having orthogonal components located at the origin of said reference coordinate frame for radiating an electromagnetic field, each of said radiating means being a magnetic-dipole source;
- transmitter means for applying to said plurality of radiating means electrical signals which differ from one another thereby creating distinguishable electromagnetic fields associated with each of said radiating means;
- a plurality of receiving means having orthogonal components disposed on said remote object for detecting and measuring said electromagnetic fields, each of said receiving means comprising a loop antenna;
- one of said plurality of radiating means and said plurality of receiving means consisting of two orthogonal components and the other consisting of three orthogonal components; and
- means for converting the components of said electromagnetic fields received by said plurality of receiving means into remote object position and orientation relative to said reference coordinate frame in a non-iterative manner with at most two ambiguous combinations of position and orientation, said means for converting operating open loop with respect to said radiating means.

10. Apparatus as recited in claim 9 wherein said means for converting comprises means for compensating for scattering of said electromagnetic fields.

11. Apparatus as recited in claim 9 wherein said radiating means and said receiving means are adapted for operation within a separation distance range where said electromagnetic fields have substantially greater near-field components than far-field components and wherein said transmitter means comprises means for applying signals to said radiating means having a frequency sufficiently low to substantially reduce interference by surrounding objects to the free-space characteristics of said electromagnetic fields.

12. Apparatus as recited in claim 9 wherein said plurality of radiating means are a plurality of mutually orthogonal, closed, current-carrying loop antennas fixedly mounted to said object.

13. Apparatus as recited in claim 9 wherein said transmitter means comprises means for multiplexing, said means for multiplexing being selected from a group of circuits including circuits for time, frequency, phase and spread spectrum multiplexing.

14. Apparatus as recited in claim 13 wherein said transmitter means comprises means for applying sinusoidal electrical signals to said radiating means.

15. Apparatus as recited in claim 1 further comprising a monitor station at a fixed location spaced from said radiating means having receiving means for detecting said radiated electromagnetic fields and being coupled to said transmitting means for providing feedback to said transmitting means characterizing said transmitted fields.

16. Apparatus as recited in claim 15 wherein said transmitter means comprises means for generating electrical signals containing information selected from the group of transmitter identification, electromagnetic field-distortion corrections, locations of obstacles, location of a landing site relative to said radiating means and wind direction.

17. Apparatus as recited in claim 16 wherein said transmitter means comprises means for generating sinusoidal electrical signals having a frequency from about 1 kHz to about 10 kHz and wherein said radiating means and said receiving means are adapted for operation within a separation distance range wherein said electromagnetic fields have near-field components substantially in excess of far-field components.

18. Apparatus for determining the orientation of an object relative to a reference coordinate frame comprising:
- a plurality of radiating means having orthogonal components located at the origin of said reference coordinate frame for radiating a plurality of electromagnetic fields;
- transmitter means for applying to said plurality of radiating means electrical signals which differ from one another thereby creating distinguishable electromagnetic fields associated with each of said radiating means;
- a plurality of receiving means having orthogonal components disposed on the object for detecting and measuring said electromagnetic fields;
- one of said plurality of radiating means and said plurality of receiving means consisting of only two orthogonal components and the other consisting of three orthogonal components; and
- means for converting the components of said electromagnetic fields received by said plurality of receiving means into object orientation in a non-iterative manner relative to said reference coordinate frame, said means for converting operating open loop with respect to said radiating means.

19. Apparatus as recited in claim 18 wherein said means for converting comprises means for compensating for scattering of said electromagnetic fields.

20. Apparatus as recited in claim 18 wherein said converting means comprises means for converting said electromagnetic fields into object position coordinates relative to said reference coordinate frame.

21. Apparatus as recited in claim 18 wherein said radiating means and said receiving means are adapted for operation within a separation distance range where said electromagnetic fields have substantially greater near-field components than far-field components and wherein said transmitter means comprises means for applying signals to said radiating means having a frequency sufficiently low to substantially reduce interference by surrounding objects to the free-space characteristics of said electromagnetic fields.

22. Apparatus as recited in claim 18 wherein each of said plurality of radiating means is a mutually orthogonal, closed, current-carrying loop antenna fixedly mounted to said object.

23. Apparatus as recited in claim 18 wherein said transmitter means comprises means for multiplexing, said means for multiplexing being selected from a group of circuits including circuits for time, frequency, phase and spread spectrum multiplexing.

24. Apparatus as recited in claim 23 wherein said transmitter means comprises means for applying sinusoidal electrical signals to said radiating means.

25. Apparatus as recited in claim 1 further comprising a monitor station at a fixed location spaced from said radiating means having receiving means for detecting said radiated electromagnetic field and being coupled to said transmitting means for providing feedback to said transmitting means characterizing said transmitted field.

26. Apparatus as recited in claim 25 wherein said transmitter means comprises means for generating electrical signals containing information selected from the group of transmitter identification, electromagnetic field distortion corrections, locations of obstacles, location of a landing site relative to said radiating means and wind direction.

27. Apparatus as recited in claim 26 wherein said transmitter means comprises means for generating sinusoidal electrical signals having a frequency from about 1 kHz to about 10 kHz and wherein said radiating means and said receiving means are adapted for operation within a separation distance range wherein said electromagnetic fields have near-field components substantially greater than far-field components.

28. Apparatus for determining the position and orientation of an object with respect to a reference coordinate frame comprising:
- a plurality of mutually orthogonal, conductive loop radiating means located at the origin of said reference coordinate frame for radiating a plurality of electromagnetic fields;
- transmitter means for applying to each of said radiating means a sinusoidal, coherent, frequency multiplexed electrical signal, a different sinusoidal, coherent, frequency multiplexed electrical signal being applied to each radiating means, thereby creating distinguishable electromagnetic fields associated with each of said radiating means;
- a plurality of mutually orthogonal, conductive loop receiving means mounted to said object for detecting and measuring components of said electromagnetic fields, each of said plurality of receiving means having a characteristic signal associated with each of said radiating means;
- one of said plurality of radiating means and said plurality of receiving means consisting of only two orthogonal components and the other consisting of three orthogonal components; and
- means for converting these components of said electromagnetic fields received by said receiving means into object position and orientation relative to said reference coordinate frame, said orientation being determined in a non-iterative manner, said converting means operating open loop with respect to said radiating means and including means for determining the distance of said object from said radiating means by comparing the strength of transmitted and received electromagnetic fields, said distance being limited to a range within which said electromagnetic fields have near field components substantially greater than far field components.

29. Apparatus as recited in claim 28 wherein said means for converting comprises means for compensating for scattering of said electromagnetic fields.

30. Apparatus as recited in claim 28 wherein said means for converting further comprises an amplifier means, a frequency translator means and a signal processor means, said signal processor means including integration means for integrating with respect to time the signal received at each of said receiving means from each of said radiating means.

31. Apparatus as recited in claim 28 wherein said radiating means and said receiving means are adapted for operation within a separation distance range where said electromagnetic fields have substantially greater near-field components than far-field components and wherein said transmitter means comprises means for applying electrical signals to said radiating means having a frequency sufficiently low to substantially reduce interference by surrounding objects to the free-space characteristics of said electromagnetic fields.

* * * * *

UNITED STATES PATENT AND TRADEMARK OFFICE
CERTIFICATE OF CORRECTION

PATENT NO. : 4,314,251

DATED : February 2, 1982

INVENTOR(S) : Frederick H. Raab

It is certified that error appears in the above—identified patent and that said Letters Patent is hereby corrected as shown below:

Column 5, line 3:

"air" should be --aid--

Column 5, line 5:

"air" should be --aid--

Column 8, line 15:

"aircaft" should be --aircraft--

Column 13, line 55:
Equation No. 3:
Should be --

$$\underset{\sim}{f}_3 = \frac{C}{\rho^3} \underset{\sim}{S} \underset{\sim}{f}_2 = \frac{C}{\rho^3} \begin{bmatrix} 1 & 0 & 0 \\ 0 & -1/2 & 0 \\ 0 & 0 & -1/2 \end{bmatrix} \underset{\sim}{f}_2 \qquad (3)$$

Column 14, Table 1:

Roll rotates Y into Z should be:

--Orientation:

$$\underset{\sim}{T}_\phi = \begin{bmatrix} 1 & 0 & 0 \\ 0 & \cos\phi & \sin\phi \\ 0 & -\sin\phi & \cos\phi \end{bmatrix} \qquad --$$

UNITED STATES PATENT AND TRADEMARK OFFICE
CERTIFICATE OF CORRECTION

PATENT NO. : 4,314,251
DATED : February 2, 1982
INVENTOR(S) : Frederick H. Raab

It is certified that error appears in the above—identified patent and that said Letters Patent is hereby corrected as shown below:

Column 14, line 31:
"$f_3$" should be -- $\underset{\sim}{f}_3$ --;

Column 14, line 32:
"$f_3$" should be -- $\underset{\sim}{f}_3$ --

Column 14, Equation No. 5:
Should be --

$$\underset{\sim}{f}_4 = \frac{C}{\rho^3} \underset{\sim}{T}_{-\alpha} \underset{\sim}{T}_{-\beta} \underset{\sim}{ST}_{\beta} \underset{\sim}{T}_{\alpha} \underset{\sim}{f}_1 = \frac{C}{\rho^3} \underset{\sim}{Q} \underset{\sim}{f}_1 \qquad (5)$$

Column 16, line 3:
Should be: $(|\hat{x}|, |\hat{y}|, |\hat{z}|)$

Column 16, line 52:
"$\rho$" should be --$\hat{\rho}$--;

Column 16, line 56:
"nearly" should be --nearby--;

Column 17, line 12:
Should be: $(\hat{x}, \hat{y}, |\hat{z}|)$

Column 17, line 15:
Should be: (e.g., $-90° \leq \phi \leq +90°$).

UNITED STATES PATENT AND TRADEMARK OFFICE
CERTIFICATE OF CORRECTION

PATENT NO. : 4,314,251
DATED : February 2, 1982
INVENTOR(S) : Frederick H. Raab

It is certified that error appears in the above—identified patent and that said Letters Patent is hereby corrected as shown below:

Column 18, line 19:

Second occurrence of: "$|Y|$" should be -- $|\hat{Y}|$ --;

Column 18, line 20:

"$\rho$" should be -- $\hat{\rho}$ --;

Column 18, line 45:

"$\hat{X} = 0$" should be -- $X = 0$ --;

Column 18, line 46:

"$Y^2$" should be -- $\hat{Y}^2$ --;

Column 18, line 66:

"Noninterative" should be --Noniterative--;

Column 19, line 10:

"A" should be --$\underset{\sim}{A}$--;

Column 19, line 26:

"A" should be --$\underset{\sim}{A}$--;

UNITED STATES PATENT AND TRADEMARK OFFICE
CERTIFICATE OF CORRECTION

PATENT NO. : 4,314,251
DATED : February 2, 1982
INVENTOR(S) : Frederick H. Raab

It is certified that error appears in the above—identified patent and that said Letters Patent is hereby corrected as shown below:

Column 19, line 30:
"by" should be --be--;

Column 19, line 31:
"A" should be --$\underset{\sim}{A}$--;

Column 19, Equation 31:

Should be:

$$\hat{\theta} = \arctan\left[\frac{f_{5X}(Z)}{f_{5X}(X)/\cos\hat{\psi}}\right] = \arctan\left[\frac{a_{13}}{a_{11}/\cos\hat{\psi}}\right] \qquad (31)$$

Column 20, line 43:
Equation No. 34:
Should be:

$$--\underset{\sim}{Q}^{-1} = (\underset{\sim}{T}_{-\alpha}\underset{\sim}{T}_{-\beta}\underset{\sim}{S}\underset{\sim}{T}_{\beta}\underset{\sim}{T}_{\alpha})^{-1} = \underset{\sim}{T}_{-\alpha}\underset{\sim}{T}_{-\beta}\underset{\sim}{S}\underset{\sim}{T}_{\beta}\underset{\sim}{T}_{\alpha} -- \qquad (34)$$

UNITED STATES PATENT AND TRADEMARK OFFICE
CERTIFICATE OF CORRECTION

PATENT NO. : 4,314,251
DATED : February 2, 1982
INVENTOR(S) : Frederick H. Raab

It is certified that error appears in the above—identified patent and that said Letters Patent is hereby corrected as shown below:

Column 21, line 9:
"$\hat{A}$" should be --$\hat{\underset{\sim}{A}}$--;

Column 21, line 12:
Equation 38 should be:

$$\hat{\underset{\sim}{A}} = \underset{\sim}{F}_5 \, \underset{\sim}{F}_4^{-1} \quad (38)$$

Column 21, line 34:
"A" should be --$\underset{\sim}{A}$--

Column 22, line 17:
"alloy" should be --allow--;

Column 22, line 58:
"Fo" should be --$f_0$--;

Column 22, line 62:
"Fo" should be --$f_0$--;

Column 23, line 8:
"a low as" should be --as low as--;

Column 25, line 25:
"landing-air" should be --landing-aid--;

Column 25, line 63:
In Equation No. 41, the first occurrence of "x" should be --$\hat{x}$--;

UNITED STATES PATENT AND TRADEMARK OFFICE
CERTIFICATE OF CORRECTION

PATENT NO. : 4,314,251
DATED : February 2, 1982
INVENTOR(S) : Frederick H. Raab

It is certified that error appears in the above—identified patent and that said Letters Patent is hereby corrected as shown below:

Column 27, line 23:
"air" (2nd Occurrence) should be --aid--;

Column 29, line 67:
"a priori" should be --a priori--;

Column 30, line 28:
"A = I" should be --$\underset{\sim}{A} = \underset{\sim}{I}$--

Column 30, line 35:
Equation 53:
Should be:

$$Q''(x,y,z) = \frac{1}{C}\underset{\sim}{F}_4 = \frac{1}{C}\underset{\sim}{F}_5 = \frac{1}{C}[\underset{\sim}{f}_5(S1) \mid \underset{\sim}{f}_5(S2) \mid \underset{\sim}{f}_5(S3)] \quad (53)$$

Column 30, line 51:
Equation 54:

"$\frac{1}{\rho^3} Q = \frac{1}{\rho^5}$" should be --$\frac{1}{\rho^3}\underset{\sim}{Q} = \frac{1}{\rho^5}$--

Column 31, lines 23-27:
Equation 58:
Should be:

$$\begin{bmatrix} \hat{x} \\ \hat{y} \\ \hat{z} \end{bmatrix} = P*(\underset{\sim}{\hat{Q}'}) \quad (58)$$

UNITED STATES PATENT AND TRADEMARK OFFICE
CERTIFICATE OF CORRECTION

PATENT NO. : 4,314,251
DATED : February 2, 1982
INVENTOR(S) : Frederick H. Raab

It is certified that error appears in the above—identified patent and that said Letters Patent is hereby corrected as shown below:

Column 32, line 7:
Equation No. 61:
Should be:

"$X^2 =$" should be $-- \hat{X}^2 = --$

Column 32, line 30:
Equation No. 62:
Should be:

$$\hat{\underline{A}} = \frac{1}{C} \underline{F}_5 (\hat{\underline{Q}}'')^{-1} = \underline{A}\, \underline{Q}'' (\hat{\underline{Q}}'')^{-1}$$

Column 32, line 34:

"$(x', y', z')$" should be $--(x, y, z)--$

Column 32, line 61:
Equation No. 63:
Should be:

$$(\underline{Q}'')^2 = (\underline{Q}'')^T \underline{Q} = \frac{1}{C^2} \underline{F}_5^T \underline{F}_5 \qquad (63)$$

Column 33, line 2:

"$Q''$" should be $--\underline{Q}''--$

UNITED STATES PATENT AND TRADEMARK OFFICE
CERTIFICATE OF CORRECTION

PATENT NO. : 4,314,251
DATED : February 2, 1982
INVENTOR(S) : Frederick H. Raab

It is certified that error appears in the above—identified patent and that said Letters Patent is hereby corrected as shown below:

Column 33, line 31:
Equation No. 67:
Should be:

$$-- \frac{1}{C} \underset{\sim}{F}_s \underset{\sim}{M}^{-1} = \underset{\sim}{A} \underset{\sim}{T}_{\phi''} \underset{\sim}{T}_{\theta''} \underset{\sim}{T}_{\psi''} = \underset{\sim}{A}' -- \qquad (67)$$

Column 33, line 41:
Equation No. 68:
Should be:

$$--\underset{\sim}{T}_c = \underset{\sim}{T}_{-\psi''} \underset{\sim}{T}_{-\theta''} \underset{\sim}{T}_{-\phi''} -- \qquad (68)$$

Column 33, line 48:

"driven" should be --derived--

Column 33, line 54:

"which" should be --when--

Column 33, line 57:

"lengthly" should be --lengthy--

Column 33, line 64:

"any numerous" should be --any of numerous--

Column 35, line 59, - Claim 14:

"13" should be --9--

UNITED STATES PATENT AND TRADEMARK OFFICE
CERTIFICATE OF CORRECTION

PATENT NO. : 4,314,251
DATED : February 2, 1982
INVENTOR(S) : Frederick H. Raab

It is certified that error appears in the above—identified patent and that said Letters Patent is hereby corrected as shown below:

Column 35, Claim 15, Line 62:

"1" should be --9--

Column 36, Claim 16, Line 1:

"15" should be --9--

Column 36, Claim 17, Line 8:

"16" should be --9--

Column 37, Claim 25, Line 4:

"1" should be --19--

UNITED STATES PATENT AND TRADEMARK OFFICE
CERTIFICATE OF CORRECTION

PATENT NO. : 4,314,251

DATED : February 2, 1982

INVENTOR(S) : Frederick H. Raab

It is certified that error appears in the above-identified patent and that said Letters Patent is hereby corrected as shown below:

Column 37, Claim 26, Line 10:

"25" should be -- 19 --.

Signed and Sealed this

Twenty-seventh Day of September 1983

[SEAL]

Attest:

Attesting Officer

GERALD J. MOSSINGHOFF

Commissioner of Patents and Trademarks